(12) United States Patent
Arcos et al.

(10) Patent No.: US 12,533,759 B1
(45) Date of Patent: Jan. 27, 2026

(54) SNAP RING EXPANDER

(71) Applicant: NEAPCO INTELLECTUAL PROPERTY HOLDINGS, LLC, Farmington Hills, MI (US)

(72) Inventors: Heladio Sánchez Arcos, Saltillo Coahuila (MX); Edgar Martínez Carlos, Saltillo Coahuila (MX)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 0 days.

(21) Appl. No.: 19/051,392

(22) Filed: Feb. 12, 2025

(51) Int. Cl.
| | |
|---|---|
| *B23P 19/12* | (2006.01) |
| *B23P 19/08* | (2006.01) |
| *B23P 19/02* | (2006.01) |
| *B23P 19/04* | (2006.01) |
| *B25B 27/02* | (2006.01) |
| *B25B 27/20* | (2006.01) |
| *F16D 3/40* | (2006.01) |

(52) U.S. Cl.
CPC ............ *B23P 19/12* (2013.01); *B23P 19/084* (2013.01); *B23P 19/02* (2013.01); *B23P 19/048* (2013.01); *B23P 2700/11* (2013.01); *B25B 27/02* (2013.01); *B25B 27/20* (2013.01); *F16D 3/405* (2013.01); *F16D 2250/0084* (2013.01); *F16D 2300/12* (2013.01); *Y10T 29/49872* (2015.01); *Y10T 29/49876* (2015.01); *Y10T 29/5363* (2015.01); *Y10T 29/53843* (2015.01)

(58) Field of Classification Search
CPC ......... Y10T 29/49876; Y10T 29/49872; Y10T 29/53561; Y10T 29/5363; Y10T 29/53843; B25B 27/02; B25B 27/20; F16D 3/405; F16D 2300/12; F16D 2250/0084; B23P 19/02; B23P 19/048; B23P 19/084; B23P 19/12; B23P 2700/11
See application file for complete search history.

(56) References Cited

U.S. PATENT DOCUMENTS

| | | | |
|---|---|---|---|
| 3,230,617 A | | 1/1966 | Spiess et al. |
| 3,324,681 A | | 6/1967 | Burns et al. |
| | | (Continued) | |

FOREIGN PATENT DOCUMENTS

| | | | | |
|---|---|---|---|---|
| JP | 2007098510 A | * | 4/2007 | |
| KR | 1389898 B1 | * | 4/2014 | ............ B23P 19/027 |

*Primary Examiner* — Jermie E Cozart
(74) *Attorney, Agent, or Firm* — Shumaker, Loop & Kendrick, LLP; James D. Miller

(57) ABSTRACT

A manufacturing assembly for installing a snap ring into a bore of a multi-axial joint includes a ram tool configured to axially force the snap ring through the bore towards a retention groove with the snap ring in a constricted configuration. An axially distal end of the ram tool includes one or more engagement elements having a tapered engagement surface configured to apply a radially outward force to the snap ring during passage thereof through the bore to urge the snap ring to expand from the constricted configuration back towards an original configuration upon the snap ring reaching the retention groove. A funnel tool configured to constrict and the direct the snap ring into the bore includes an alignment key configured for reception within a keyway of the ram tool during installation of the snap ring to orient the funnel tool and the snap ring relative to the ram tool.

16 Claims, 8 Drawing Sheets

(56) References Cited

U.S. PATENT DOCUMENTS

| | | | | |
|---|---|---|---|---|
| 3,537,163 | A * | 11/1970 | Steidl | F16B 21/183 |
| | | | | 29/898.07 |
| 4,558,502 | A | 12/1985 | Gossman et al. | |
| 5,911,459 | A * | 6/1999 | Hofmann | F16C 35/067 |
| | | | | 29/898.07 |
| 6,507,985 | B1 * | 1/2003 | Loughlin | B23P 19/084 |
| | | | | 29/229 |
| 6,722,011 | B1 * | 4/2004 | Bacon | B23P 19/084 |
| | | | | 29/888.09 |
| 8,438,715 | B1 * | 5/2013 | Cronin | B23P 19/084 |
| | | | | 29/451 |
| 8,938,869 | B2 | 1/2015 | O'Neill | |
| 2004/0194277 | A1 * | 10/2004 | Hunter | B23P 19/084 |
| | | | | 29/450 |

* cited by examiner

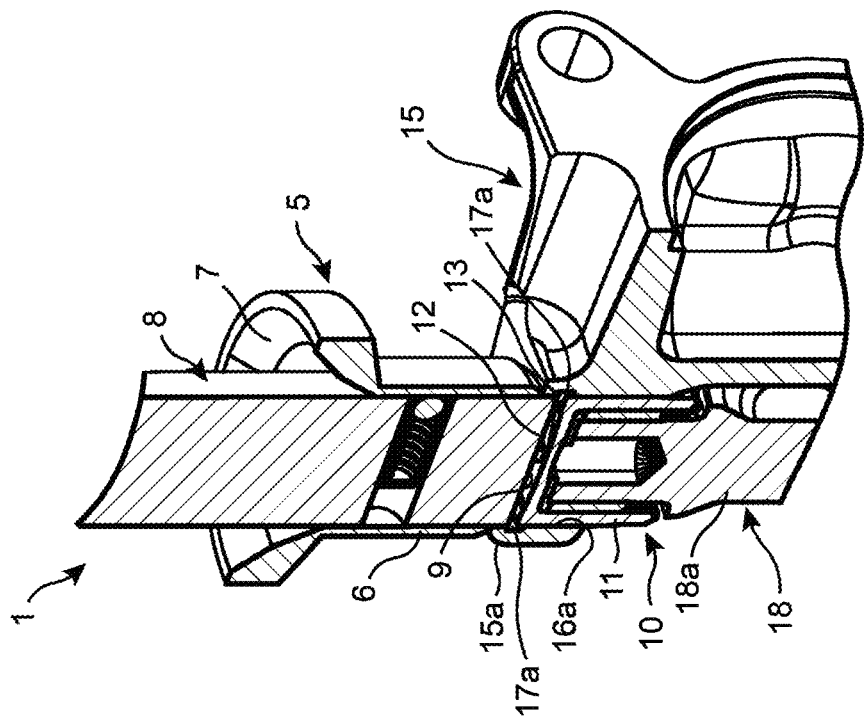
FIG. 4 - PRIOR ART
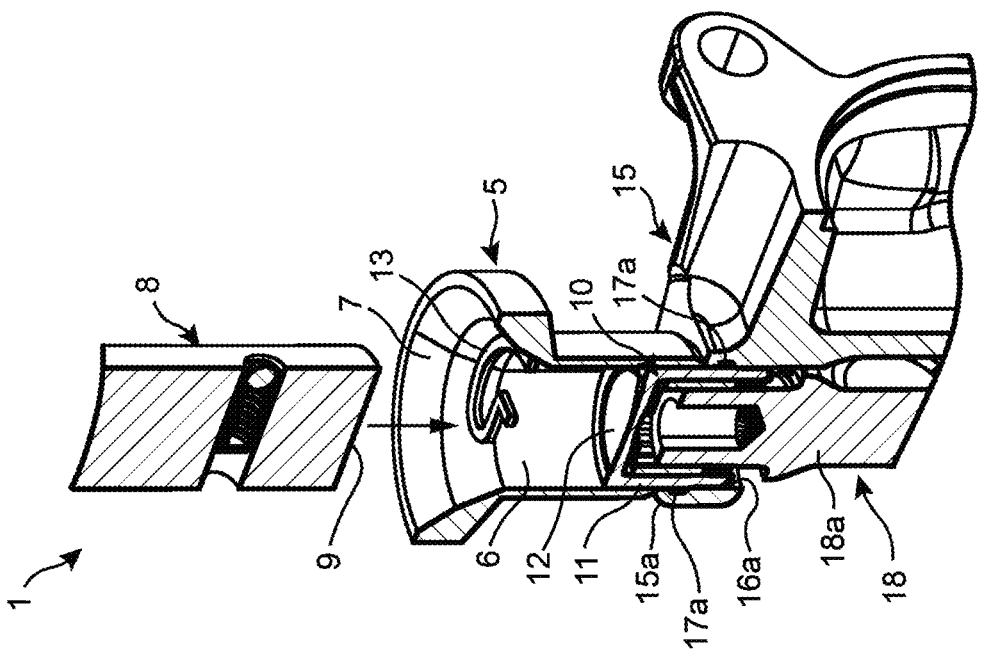
FIG. 3 - PRIOR ART

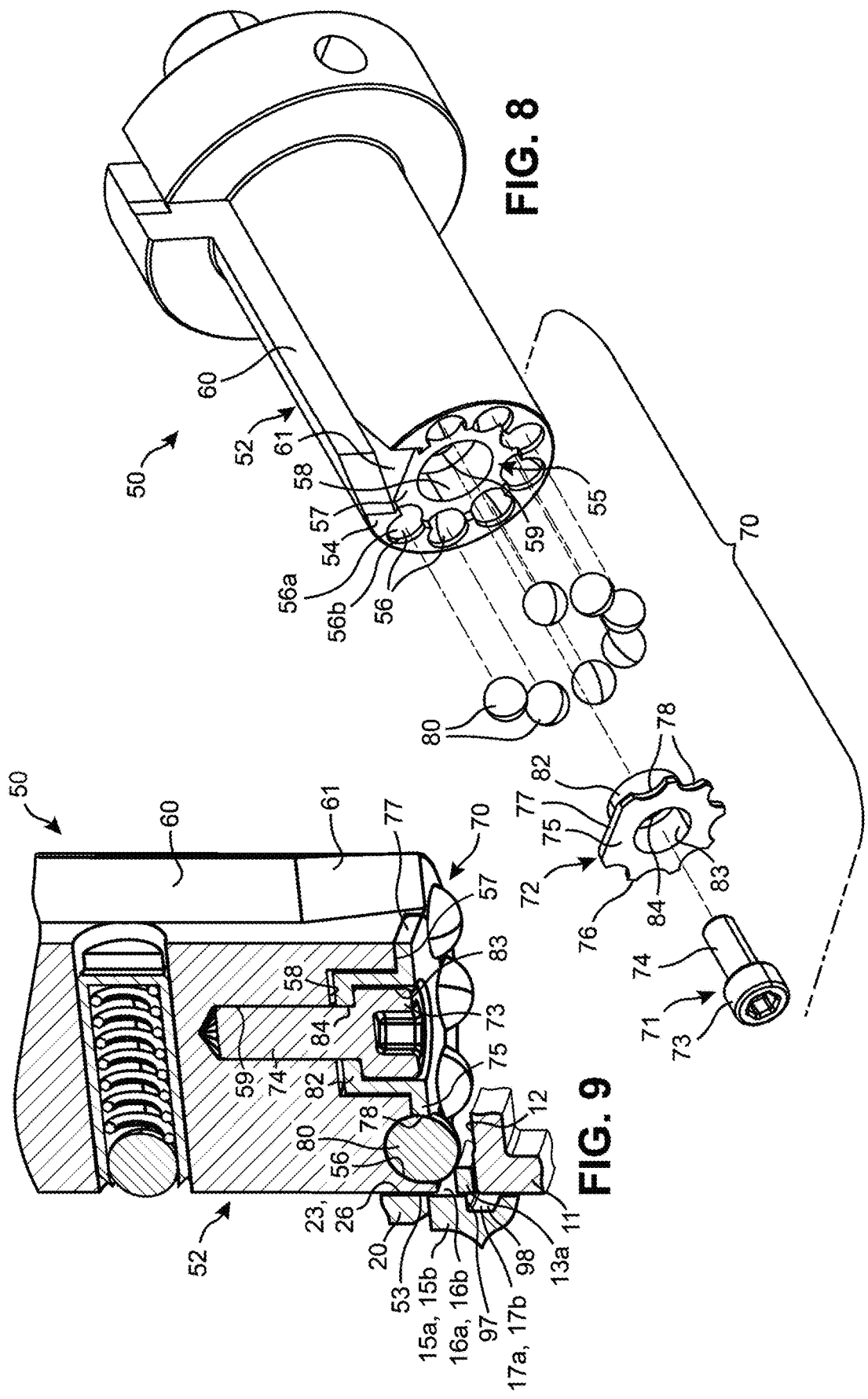

US 12,533,759 B1

SNAP RING EXPANDER

FIELD OF THE INVENTION

The invention relates to an apparatus and method for assembling a drive assembly of a vehicle having a multi-axial joint, and more particularly, to an apparatus and method for fully installing a snap ring at a junction of a bearing cup assembly and a yoke of the multi-axial joint.

BACKGROUND OF THE INVENTION

It is common for a drive assembly of a motor vehicle to include a multi-axial universal joint, such as a Cardan joint. Universal joints allow a propeller shaft of the drive assembly to transmit power through a variable angle during rotation of the propeller shaft without an appreciable increase in friction or play between the propeller shaft and the driven component. A Cardan joint typically include a cross member (sometimes referred to as a spider) pivotally coupled to each of two yokes that are associated with adjacent shaft components of the drive assembly. Each of the yokes includes a U-shaped configuration formed by two spaced apart projections (sometimes referred to as lugs) extending axially from an end of the corresponding yoke, wherein each of the respective projections of the two yokes is pivotally coupled to one of the four shaft portions (sometimes referred to as pins) extending outwardly from a center of the cross member. This configuration results in a first one of the yokes coupled to the cross member pivoting about a first axis of rotation of the cross member and the second one of the yokes coupled to the cross member pivoting about a second axis of rotation of the cross member arranged perpendicular to the first axis of rotation thereof.

Each pivotal connection formed between one of the four outwardly extending shaft portions of the cross member and one of the yoke projections may include use of a bearing assembly that ensures smooth motion and minimized friction during pivoting of either of the yokes relative to the cross member. Typically, such bearing assemblies include a cylindrical bearing cup that is received around a corresponding shaft portion of the cross member with an end of the shaft portion engaging a closed end of the bearing cup and a plurality of bearings disposed radially between the outer surface of the corresponding shaft portion and an inner surface of the bearing cup. The bearing cup is also received within a cylindrical opening (sometimes referred to as a yoke bore) formed through the corresponding yoke projection of one of the yokes of the Cardan joint, and the bearing cup is typically secured into place within the cylindrical opening of the yoke projection via use of what is commonly referred to as a snap ring. The snap ring is configured to being constricted radially inwardly for entry into the corresponding cylindrical opening before then expanding radially outwardly upon reaching the axial position of a retention groove formed along the interior surface defining the corresponding cylindrical opening, wherein such outward expansion of the snap ring secures an axial position of the snap ring along the cylindrical opening while also forming a stop for preventing further axial movement of the closed end of the corresponding bearing cup therebeyond due to the snap ring being partially disposed within the groove and also partially disposed within the path of the bearing cup along the cylindrical opening.

FIGS. 1-4 illustrate aspects of a manufacturing assembly 1 suitable for performing the installation of an associated bearing assembly 10 having a bearing cup 11 (shown in cross-section in FIGS. 3 and 4) via use of a snap ring 13 (shown in isolation in FIG. 2) in accordance with the description of a representative Cardan joint as provided above. The assembly 1 generally includes a mounting table 2, a funnel tool 5, and a ram tool 8 that perform the installation process relative to the snap ring 13, a yoke 15, a cross member 18, and the bearing assembly 10. The yoke 15 includes a first yoke projection 15a (lug) having a first cylindrical yoke bore 16a and a spaced apart second yoke projection 15b (lug) having a second cylindrical yoke bore 16b, wherein the first and second yoke bores 16a, 16b are co-axially aligned along vertical axis extending between the first and second yoke projections 15a, 15b. The yoke 15 is positioned and oriented relative to the manufacturing assembly 1 via reception of a spring-loaded centering pin 3 of the mounting table 2 through the second yoke bore 16b in a manner aligning the ram tool 8 to move in a reciprocating manner along the common axis of the first and second yoke bores 16a, 16b. The spring-loaded centering pin 3 is cylindrical in shape and is also slidably received within a cylindrical opening of a spring-loaded support structure 4 capable of reciprocating relative to the mounting table 2. An annular and downwardly facing surface of the second yoke projection 15b surrounding the second yoke bore 16b rests on an annular and upwardly facing surface of the spring-loaded support structure 4 such that the yoke 15 is supported thereon and can reciprocate in unison with the underlying support structure 4.

The cross member 18 is disposed such that a first shaft portion 18a thereof (shown in FIGS. 3 and 4) is disposed through the first yoke bore 16a while an oppositely arranged second shaft portion 18b rests upon the spring-loaded centering pin 3, wherein the illustrated first and second shaft portions 18a, 18b extend in opposite directions along the common axis extending between the first and second yoke bores 16a, 16b. The bearing assembly 10 is also received within the first yoke bore 16a with a closed end 12 of the bearing cup 11 thereof facing towards a planar engagement surface 9 of the ram tool 8 formed at a distal end thereof. At least a portion of the bearing cup 11 that includes the closed end 12 thereof extends axially outside of the first yoke bore 16a such that a locating cylinder 6 of the funnel tool 5 is able to be received over the bearing cup 10 with an annular and downwardly facing surface at a bottom of the locating cylinder 6 resting upon an annular and upwardly facing surface of the first yoke projection 15a surrounding the first yoke bore 16a. The snap ring 13 is received within a tapered portion 7 of the funnel tool 5 that defines a radially inwardly tapered surface decreasing in diameter in a direction towards the adjoining locating cylinder 6 (and the closed end 12 of the bearing cup 11 received therein) to result in the formation of a frustoconical inner surface extending axially along the tapered portion 7 and leading to a cylindrical inner surface extending axially along the locating cylinder 6.

In operation, the ram tool 8 is caused to translate downwardly to cause the planar engagement surface 9 thereof to enter the tapered portion 7 of the funnel tool 5 and apply a downward force to the snap ring 13. As shown in FIG. 2, the snap ring 13 is provided as an elongate strip of material bent to include a annular or circular segment 13a having a constant radius of curvature (circular shape) extending through greater than 180 degrees of angular displacement (240 degrees as shown) as well as inwardly bent and freely disposed first and second end segments 13b, 13c, each of which bends radially inwardly from a respective end of the annular segment 13a in a direction towards a central region of the circular shape formed by the annular segment 13a.

The described configuration of the snap ring 13 facilitates the snap ring 13 being capable of resiliently flexing inwardly to constrict to include a reduced maximum diameter in comparison to an original maximum diameter thereof when resting within the tapered portion 7 prior to engagement with the ram tool 8. As the ram tool 8 progressively forces the snap ring 13 through the tapered portion 7 of the funnel tool 5, the snap ring 13 constricts in the manner described until the ram tool 8 is pushing the snap ring 13 through the locating cylinder 6 with a maximum diameter across the snap ring 13 equal to the inner diameter of the locating cylinder 6, which eventually results in the snap ring 13 engaging the closed end 12 of the bearing cup 11.

The ram tool 8 continues to progress downwardly to cause the snap ring 13 and the bearing assembly 10 to each slide along the cylindrical inner surface of the locating cylinder 6 and then the cylindrical inner surface defining the first yoke bore 16a, which are arranged continuously with common inner diameters at a transition therebetween, while the cross member 18 is also pressed downwardly by the movement of the bearing assembly 10 against the spring force of the spring-loaded centering pin 3. That is, the snap ring 13, the bearing assembly 10, and the cross member 18 all move downwardly relative to the mounting table 2 such that the spring-loaded centering pin 3 is also moved downwardly (via contact with the second shaft portion 18b) in a manner progressively increasing the spring force counteracting the downward movement of the described components 10, 13, 18. In the present example, the downward movement of the spring-loaded centering pin 3 also results in a downward force being applied to the one or more springs associated with the spring-loaded support structure 4 in a manner causing the spring-loaded support structure 4 to also move downwardly relative to the mounting table 2 with the assembly of the yoke 15, the cross member 18, and the funnel tool 5 moving in unison therewith. The centering pin 3 and the support structure 4 are configured to depress downwardly in a manner wherein the associated spring assemblies thereof provide progressively increasing upward forces to the cross member 18 and the yoke 15 that counteract the downward forces applied by the ram tool 8 in a manner facilitating the disclosed installation of the snap ring 13 and the bearing assembly 10.

The snap ring 13 and the bearing assembly 10 continue to progress through the first yoke bore 16a until a radially outwardly indented and annular first retention groove 17a formed along the cylindrical inner surface of the first yoke bore 16a allows the snap ring 13 to resiliently expand back towards its original size and configuration in a manner causing the snap ring 13 to expand radially outwardly into the first retention groove 17a. The snap ring 13 and the first retention groove 17a are dimensioned radially such that the snap ring 13 is disposed partially within the first retention groove 17a and partially within the first cylindrical opening 16a at a radial position for preventing axial movement of the bearing cup 11, which is still engaging the snap ring 13 along the closed end 12, in an outward axial (upward) direction back towards the ram tool 8. The snap ring 13 is thus positioned to delimit axial movement of the cross member 18 and the adjoining bearing assembly 10 with respect to the identified axial direction.

One significant concern associated with the above-described installation process occurs when attempting to install another bearing assembly 10 and snap ring 13 within a second retention groove 17b of the second yoke bore 16b via use of the above-described manufacturing assembly 1 and at an instance following the retention of the snap ring 13 within the first retention groove 17a of the first yoke bore 16a. The installation of the opposing bearing assembly 10 includes an inversion of the orientation of the yoke 15 and the cross member 18 to include the second yoke projection 15b and the second shaft portion 18b upwardly disposed such that the ram tool 8 is aligned to approach the funnel tool 5 for installing the second snap ring 13 within the second retention groove 17b formed within the second yoke bore 16b. The process is substantially identical to that previously described with respect to the initially installed snap ring 13 except that the axial delimiting effect of said initial snap ring 13 being disposed within the first retention groove 17a results in the inability of the cross member 18 and the previously installed bearing assembly 10 to continue to progress downwardly upon contacting the already installed snap ring 13 disposed within the first yoke projection 15a.

The disclosed manufacturing method includes the assembly of the cross member 18 and the corresponding bearing cup assemblies 10 being properly and fully installed within the yoke 15 only when slightly compressed between the first and second retention grooves 17a, 17b along the axial direction of the first and second shaft portions 18a, 18b to prevent undesirable play, and hence vibration, of the cross member 18 and/or the bearing assemblies 10 relative to the yoke 15 during operational use of the corresponding drive assembly. The need for this slight degree of axial compression of the cross member 18 and each of the co-axial bearing assemblies 10 results in a much higher axial force being present between the subsequently installed snap ring 13 and the planar engagement surface 9 of the ram tool 8 as the subsequent snap ring 13 is reaching the axial position of the second retention groove 17b than is present between the planar engagement surface 9 of the ram tool 8 and the initial snap ring 13 when the initial snap ring 13 is installed within the first retention groove 17a.

It has been discovered that such relatively high axial forces present between the planar engagement surface 9 and the subsequent snap ring 13 leads to a frictional force present therebetween, as well as between the subsequent snap ring 13 and the engaging closed end 12 of the bearing cup 11, being great enough in the radial direction of the second cylindrical opening 16b that the corresponding snap ring 13 is not always capable of fully expanding radially outwardly into the second retention groove 17b in the manner intended merely via the resiliency of the snap ring 13 following the radial inward constriction thereof. Such a partially expanded snap ring 13 may disadvantageously become dislodged or otherwise loosened such that the integrity of the Cardan joint is potentially threatened, hence the snap ring 13 cannot remain within the joint in this partially expanded state.

When encountering such a partially expanded snap ring 13, one solution includes employing a human operator to fully expand the snap ring 13 into the corresponding retention groove 17a, 17b via use of hand manipulated tools. More specifically, the human operator may utilize a chisel and associated hammer to force portions of the snap ring 13 radially outwardly into the corresponding retention groove 17a, 17b until the snap ring 13 is desirably located within the corresponding retention groove 17a, 17b in a manner preventing undesirable removal thereof.

Unfortunately, such a manual operation is disadvantageous for multiple reasons. First, the need to perform additional manufacturing steps with respect to the disclosed manufacturing assembly 1 increases the cycle time, tooling, and labor necessary with respect to the assembly of each such Cardan joint, thus rendering the disclosed manufacturing process as inherently more costly, time consuming, and inefficient than is necessary. Second, the described process does not include a step of locating the snap ring 13 within the corresponding yoke bore 16a, 16b at a specific rotational orientation, thereby leading to the human operator assigned to fully expanding the snap ring 13 into the corresponding retention groove 17a, 17b having to address each respective snap ring 13 individually and from different positions and orientations, which is undesirable from an ergonomic standpoint while also possibly adding more time and complexity to the completion of each cycle. Third, the use of the chisel and hammer presents a concern that the snap ring 13, adjacent components of the Cardan joint, and/or adjacent components of the manufacturing assembly 1 may incidentally be damaged or otherwise interfered with via the process of fully installing the associated snap ring 13 with such tools.

Alternative manufacturing processes may be utilized to ensure the proper installation and retention of such a snap ring into such a Cardan joint, but such alternative processes typically require alternative and/or additional manufacturing steps that employ alternative and/or additional tooling components that render use of such alternative processes as impractical or undesirable in forming such a Cardan joint. For example, it is known to further deform the yoke of the associated Cardan joint via the addition of a stake to the associated yoke bore following installation of the snap ring, or by form rolling the associated yoke bore onto the corresponding joint. However, such processes that utilize deformation of the yoke may be disadvantageous due to the need to utilize a thinner bearing cup, the need to monitor the corresponding deformation of the yoke to confirm proper formation of the associated retention feature, and the need for complex and costly equipment to perform the desired deformation in a manner facilitating the aforementioned monitoring of the associated deformation of the yoke. Furthermore, the permanent deformation of the yoke following the installation of the associated bearing cup results in an inability to provide service to the components forming the Cardan joint, and instead necessitates the replacement of the entirety of the Cardan joint or the entirety of the propeller shaft assembly including such a Cardan joint, thereby significantly increasing the time and cost to service or repair such multi-axial/universal joints.

It would therefore be desirable to provide a new and improved manufacturing assembly and associated method of use thereof that fully installs a snap ring into a yoke bore in an efficient, reliable, and cost effective manner, and that further provides consistency regarding the installed configuration of each such snap ring to aid in inspecting and/or servicing the corresponding multi-axial joint following assembly thereof.

SUMMARY OF THE INVENTION

Compatible and attuned with the present invention, a manufacturing assembly and associated method that fully installs a snap ring into a yoke bore in an efficient, cost-effective, and repeatable manner has surprisingly been discovered.

In one embodiment of the invention, a manufacturing assembly for installing a snap ring into a bore extending through a structure is disclosed, wherein the snap ring includes an original configuration and a constricted configuration from which the snap ring attempts to resiliently expand back towards the original configuration. The manufacturing assembly includes a ram tool configured to axially force the snap ring through the bore towards a retention groove formed therealong with the snap ring in the constricted configuration. An axially distal end of the ram tool facing towards the snap ring includes one or more engagement elements with each of the engagement elements having a tapered engagement surface configured to apply a radially outwardly extending force to the snap ring during passage thereof through the bore in order to urge the snap ring to expand from the constricted configuration back towards the original configuration upon the snap ring reaching an axial position of the retention groove.

According to another embodiment of the present invention, a manufacturing assembly for installation of a snap ring into a bore extending through a structure includes a funnel tool having an inner surface defining a passageway leading into the bore of the structure as well as an alignment key disposed within the passageway and extending in an axial direction thereof. The inner surface of the funnel tool is configured to constrict the snap ring from an original configuration to a constricted configuration during passage of the snap ring through the passageway with the constricted configuration of the snap ring allowing passage of the snap ring through the bore while the snap ring attempts to resiliently expand back to the original configuration. A ram tool of the manufacturing assembly is configured to axially force the snap ring through the passageway of the funnel tool and the bore of the structure until the snap ring resiliently expands back towards the original configuration within a retention groove formed along the bore. The ram tool includes a keyway formed therein that is configured to receive the alignment key of the funnel tool during movement of the ram tool through the passageway of the funnel tool.

A method of installing a snap ring into a bore of a structure according to the present invention is also disclosed. The method includes the steps of: constricting a snap ring from an original configuration to a constricted configuration from which the snap ring attempts to resiliently expand back towards the original configuration; and applying a force to the snap ring when the snap ring is in the constricted configuration and disposed within the bore, the force applied by an engagement surface of a ram tool, the force including an axial component and a radial component, the axial component directed in the axial direction of the bore to cause the snap ring to move through the bore towards a retention groove formed therealong and the radial component directed in a radially outward direction of the bore to urge the snap ring to expand back towards the original configuration upon reaching an axial position of the retention groove.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 3 is a fragmentary perspective cross-sectional view of the manufacturing assembly of FIG. 1 showing a configuration of the manufacturing assembly prior to installation of the snap ring into the multi-axial joint;

FIG. 4 is a fragmentary perspective cross-sectional view of the manufacturing assembly of FIG. 1 showing a configuration of the manufacturing assembly during the installation of the snap ring into the multi-axial joint;

FIG. 8 is an exploded perspective view of the ram tool of the manufacturing assembly of FIG. 5;

FIG. 9 is a fragmentary perspective cross-sectional view of the ram tool as taken along a plane passing through a central axis thereof, wherein the ram tool is shown relative to portions of each of the funnel tool, a yoke of the multi-axial joint, a bearing cup, and the snap ring immediately prior to retention of the snap ring within a bore of the yoke;

DETAILED DESCRIPTION OF THE INVENTION

Figures 1, 2:
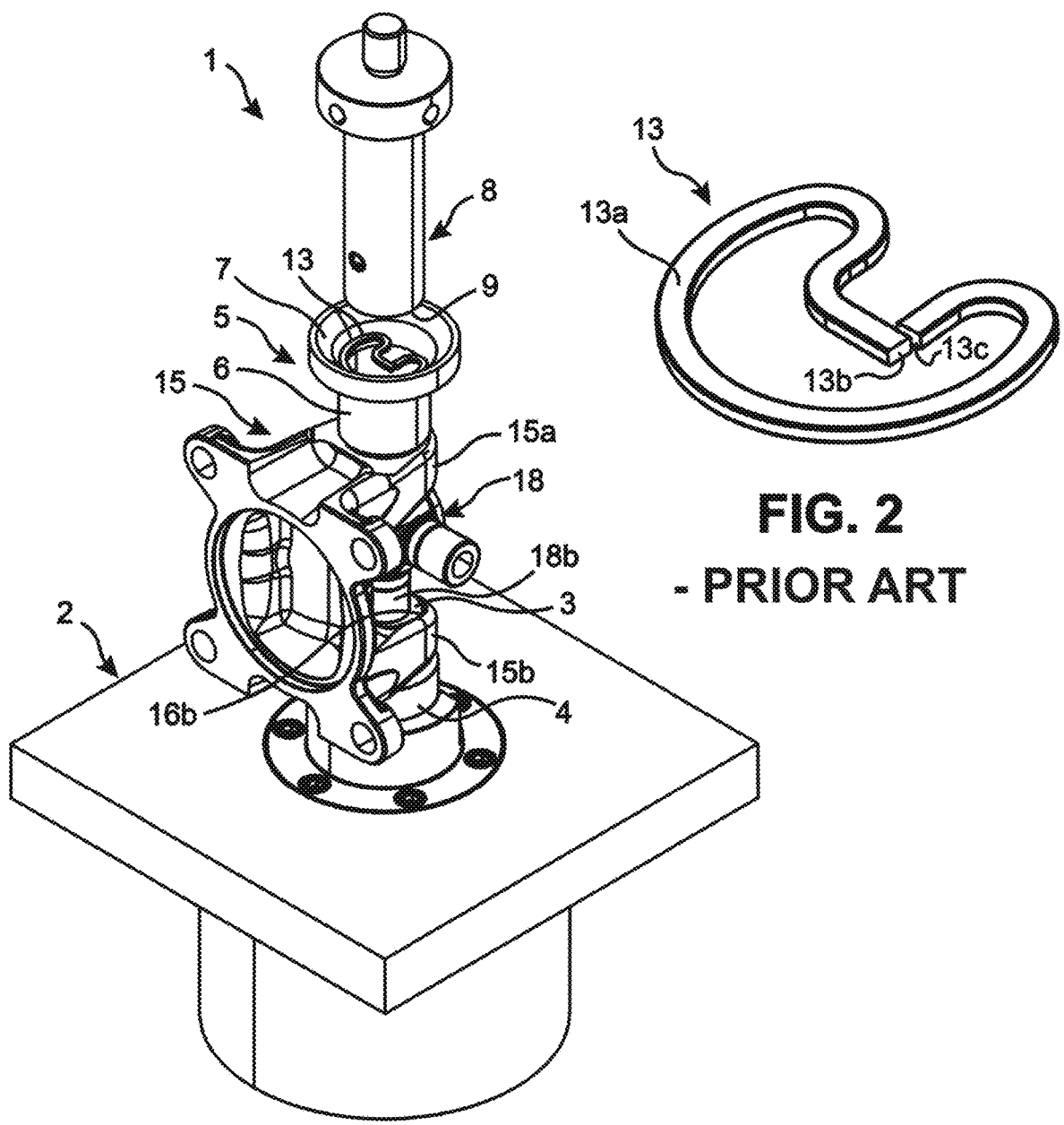
FIG. 1 is perspective view of a manufacturing assembly for installing a snap ring into a multi-axial joint.
FIG. 2 is an enlarged perspective view of the snap ring of FIG. 1 in isolation.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 5:
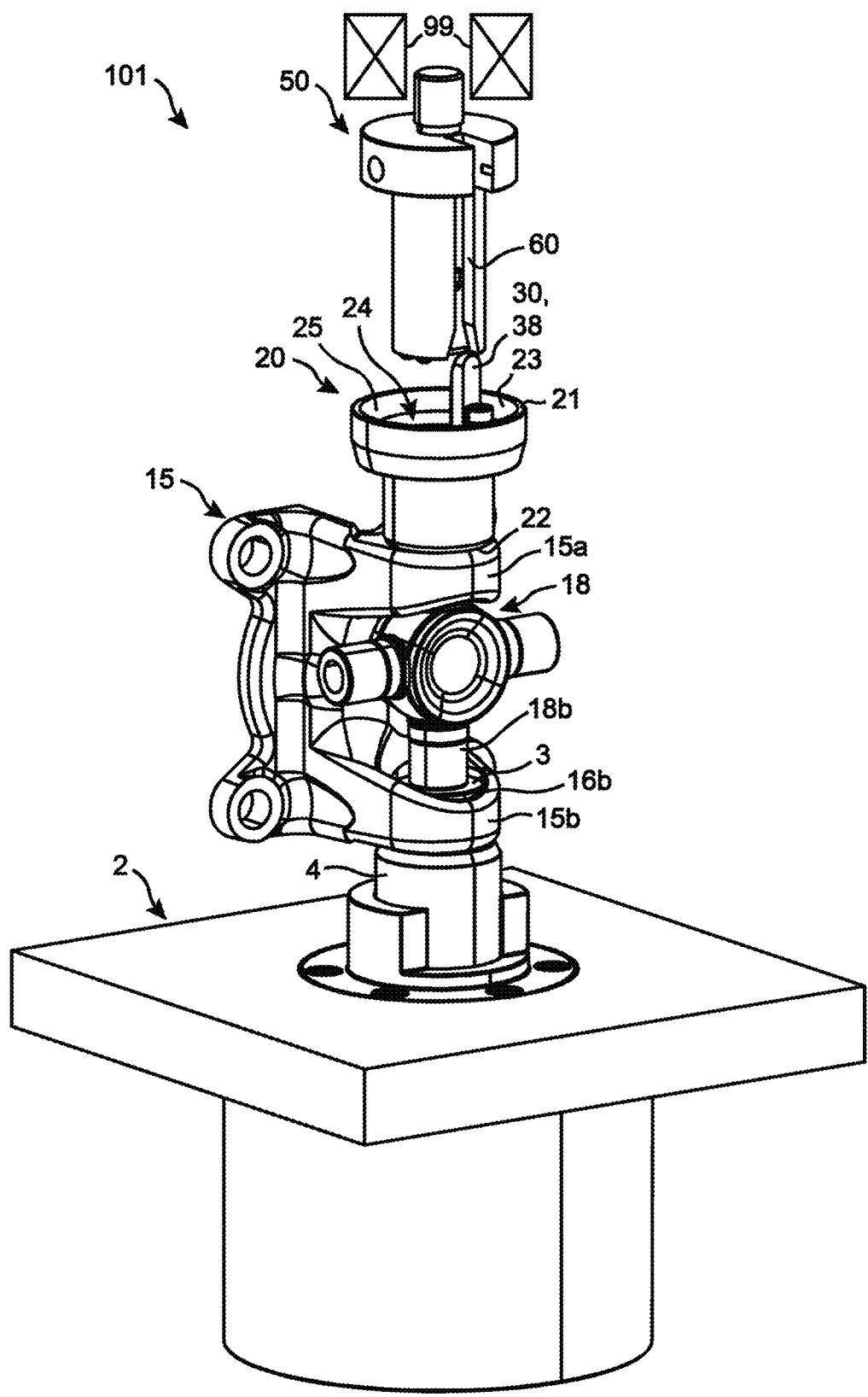
FIG. 5 is a perspective view of a manufacturing assembly for installing a snap ring into a multi-axial joint according to an embodiment of the present invention.

FIG. 5 illustrates a manufacturing assembly 101 according to an embodiment of the present invention. The manufacturing assembly 101 is similar to the manufacturing assembly 1 disclosed in FIGS. 1-4 and thus includes the same reference numerals with respect to those features shared by each of the manufacturing assemblies 1, 101. Additionally, the components being assembled via each respective manufacturing assembly 1, 101, such as the yoke 15, the cross member 18, the bearing assemblies 10, and the snap rings 13 forming the representative Cardan joint, also include the same structure as that shown and described with respect to FIGS. 1-4 and thus similarly include the same reference numerals.

The manufacturing assembly 101 differs from the manufacturing assembly 1 via the use of a modified funnel tool 20 and a modified ram tool 50 that each include novel features for properly and fully installing the snap rings 13 into the yoke 15 of the corresponding universal joint for the purpose of retaining the corresponding bearing assemblies 10 therein in accordance with the manufacturing process generally described in discussing the background of the present invention. Specifically, the disclosed ram tool 50 is configured to minimize any frictional forces occurring between the ram tool 50 and each of the snap rings 13 with respect to the radial direction of the corresponding yoke bore 16a, 16b while also beneficially applying a radially outwardly directed force to each of the respective snap rings 13 such that each of the snap rings 13 is urged to resiliently snap back to a radially outwardly expanded configuration upon each of the snap rings 13 reaching the axial position of the corresponding retention groove 17a, 17b formed along each respective yoke bore 16a, 16b. The funnel tool 20 and the ram tool 50 also include complimentary locating features for beneficially establishing the same orientation between each of the snap rings 13, the yoke 15, and the components of the manufacturing assembly 101 with respect to each installation process, thereby maintaining consistency between different installation cycles of the manufacturing assembly 101, as well as consistency of the structural configuration of different universal joints assembled via the manufacturing assembly 101.

The present process is described with specific reference to a Cardan joint as the form of multi-axial/universal joint being assembled via the manufacturing assembly 101, but it should be apparent to one skilled in the art that the described assembly 101 and process may be utilized in forming any type of multi-axial/universal joint utilizing the axial insertion of one or more snap rings (or equivalents thereto) into one or more respective bores for eventual radial expansion of each of the snap rings into a retention groove (or equivalent thereto) formed along each of the respective yoke bores while remaining within the scope of the present invention, and especially where each of the snap rings is installed within the corresponding one of the yoke bores for the purpose of delimiting axial movement of an axially compressed component of the associated multi-axial/universal joint that is received within the corresponding one of the yoke bores. In other words, the same principles disclosed herein with reference to the exemplary Cardan joint may be understood to apply to similar circumstances as may be experienced in assembling alternative forms of multi-axial/universal joints utilizing such retention features. It should also be apparent that the presently disclosed manufacturing assembly 101 and method of use thereof may be adapted for alternative applications that similarly require the use of relatively high axial forces in installing such a snap ring (or equivalent thereto) where such relatively high axial forces may present a concern of frictional seizure of the snap ring relative to an associated ram tool (or equivalent thereto) such that the snap ring does not resiliently spring back radially outwardly towards an original configuration thereof as required for proper installation of the snap ring in the corresponding structure, including applications unrelated to the assembly of a multi-axial/universal joint.

With respect to the disclosed assembly of a representative Cardan joint, the manufacturing assembly 101 may be utilized in installing each of two distinct bearing assemblies 10 with respect to the opposing first and second shaft portions 18a, 18b extending along a common axis of the cross member 18 in similar fashion to that described with respect to the manufacturing assembly 1 of FIGS. 1-4. An initial step for installing a first one of the snap rings 13 may include the cross member 18 moving downwardly against a spring force generated by a spring assembly (not shown) associated with the spring-loaded centering pin 3 during the process of axially inserting the snap ring 13 into the first yoke bore 16a, whereas a subsequent step for installing the second one of the snap rings 13 into the second yoke bore 16b (upon a reversal of the orientation of the yoke 15) may include the cross member 18 being axially delimited from further (downward) movement as a result of the prior installation of the first one of the snap rings 13 within the first retention groove 17a of the first yoke bore 16a. The subsequent step of installing the second one of the snap rings 13 may thus include the use of greater axial forces present between the ram tool 50, the associated snap ring 13, and the associated bearing assembly 10 in attempting to slightly compress the grouping of the cross member 18 and the opposing bearing assemblies 10 along the axis of extension of the shaft portions 18a, 18b when the second one of the snap rings 13 reaches the associated second retention groove 17b of the second yoke bore 16b, wherein such slight compression of said components along the designated axis results in the elimination of undesirable play, and thus vibration, within the Cardan joint during operation thereof.

The disclosed manufacturing assembly 101 utilizes the same beneficial relationships present between the structure of the snap ring 13, the funnel tool 20, the ram tool 50, the yoke 15, and the bearing assembly 10 regardless of whether the instantaneously performed step is the initial step of installing the first pairing of one of the bearing assemblies 10 and one of the snap rings 13 or the subsequent step of installing the second and opposing pairing of one of the bearing assemblies 10 and one of the snap rings 13, hence only the initial step is shown and described in detail hereinafter with respect to the presently disclosed figures. That is, although the beneficial features of the presently disclosed manufacturing assembly 101 may be most relevant in preventing seizure of one of the snap rings 13 when performing the subsequent step where the joint is slightly compressed in a manner wherein greater frictional forces may be present between the snap ring 13 and each of the ram tool 50 and the bearing cup 11 of the associated bearing assembly 10, the depiction and description of the corresponding interactions with respect to the initial step may also be applied to the subsequent step with only the magnitude of the relevant forces differing between the two steps with respect to the relevant features of the presently disclosed invention. The novel configuration of the ram tool 50 results in the desired expansion of the snap ring 13 regardless of whether the step being performed is the initial step or the subsequent step, and regardless of whether the forces preventing progression of the ram tool 50 into the corresponding yoke bore 16a, 16b are being provided primarily by the resistance of a spring assembly or by the prior affixing of one of the snap rings 13 within the first retention groove 17a for delimiting further axial movement of the grouping of the bearing assemblies 10 and the cross-member 18.

The manufacturing assembly 101 includes the mounting table 2, the spring-loaded centering pin 3, and the spring-loaded support structure 4 as shown and described with reference to the manufacturing assembly 1 of FIGS. 1, 3 and 4. According to one possible configuration of the manufacturing assembly 101, the support structure 4 (which supports the yoke 15 thereon during the installation of each of the snap rings 13) is able to move (vertically) downwardly relative to the mounting table 2 as a result of the downward forces applied to the yoke 15 during an installation process using the ram tool 50. This downward movement of the support structure 4 results in the spring assembly associated with the support structure 4 being progressively compressed such that the spring assembly applies a progressively increasing upward force to the yoke 15 (by way of the support structure 4), which may continue to occur until the opposing forces between the ram tool 50 and the spring assembly of the support structure 4 balance out to cease the downward movement of the yoke 15 relative to the stationary mounting table 2.

A spring assembly associated with the centering pin 3 may include a first end pressing upwardly on the centering pin 3 against the forces applied by the ram tool 50 and a second end pressing downwardly on a surface of the support structure 4 against the urging of the spring assembly thereof, thereby resulting in compression of the spring assembly associated with the centering pin 3 also resulting in the application of a force to the support structure 4 for causing compression of the spring assembly associated therewith. In any event, the spring assemblies associated with the centering pin 3 and the support structure 4 are configured to allow for the necessary motion of the cross member 18 and bearing assemblies 10 and/or the necessary motion of the yoke 15 during the installation of one of the snap rings 13, and are further configured to provide the necessary counter forces against those provided by the ram tool 50 for facilitating the necessary movement of any of the snap ring 13, the bearing assembly 10, or the cross member 18 relative to one another. Alternative locating assembly and spring assembly configurations from those shown and described may be utilized without necessarily departing from the scope of the present invention, so long as the ram tool 50 is able to cause the relative motion of the components of the Cardan joint as shown and described herein.

The funnel tool 20 extends axially from a first end 21 to a second end 22 thereof. The first end 21 forms a first annular rim of the funnel tool 20 facing upwardly towards the ram tool 50 and the second end 22 forms a second annular rim of the funnel tool 20 configured to face downwardly and selectively engage (rest upon) a corresponding surface of the instantaneously upwardly disposed yoke projection 15a, 15b, depending on whether the funnel tool 20 is being utilized to perform the initial snap ring installation or the subsequent and opposing snap ring installation. In the present figures, the second end 22 of the funnel tool 20 is resting upon an annular surface of the first yoke projection 15a circumscribing the first yoke bore 16a as occurs in performing the initial snap ring installation step.

An inner surface 23 of the funnel tool 20 defines a passageway 24 through which the instantaneously installed snap ring 13 and the ram tool 50 must pass to enter into the upwardly disposed one of the yoke bores 16a, 16b, which is the first yoke bore 16a in the presently illustrated example. The passageway 24 extends axially through the funnel tool 20 and is divisible in the axial direction thereof to include a tapered portion 25 towards the first end 21 thereof and a cylindrical portion 26 towards the second end 22 thereof. The tapered portion 25 includes the inner surface 23 of the funnel tool 20 being tapered radially inwardly when progressing axially in a direction from the first end 21 towards the second end 22 of the funnel tool 20 such that the inner surface 23 takes on a frustoconical shape having a progressively decreasing inner diameter along the tapered portion 25. However, alternative tapers, such as an arcuate and varying taper, may be utilized without departing from the scope of the present invention. An end of the tapered portion 25 spaced apart axially from the first end 21 of the funnel tool 20 intersects and transitions to the cylindrical portion 26 of the passageway 24. The cylindrical portion 26 of the passageway 24 includes a constant inner diameter along the axial length thereof, wherein the constant inner diameter is equal to the inner diameter of the intersecting end of the tapered portion 25. The inner diameter of the passageway 24 along the cylindrical portion 26 is selected to be substantially equal to an inner diameter of the instantaneously adjacent yoke bore 16a, 16b such that the cylindrical shape formed by the inner surface 23 of the funnel tool 20 along the cylindrical portion 26 transitions substantially continuously (absent a significant step or shoulder) to the cylindrical shape formed by the surface defining the instantaneously adjacent yoke bore 16a, 16b.

The inner diameter of the passageway 24 along the cylindrical portion 26 is also selected to be substantially equal to an outer diameter of the bearing cup 11 of each associated bearing assembly 10 installed into one of the yoke bores 16a, 16b. The manufacturing assembly 101 may include the bearing cup 11 being disposed at an axial position such that the closed end 12 thereof is disposed outside of the instantaneously adjacent yoke bore 16a, 16b while the opposing open end of the bearing cup 11 is received to be disposed within the adjacent yoke bore 16a, 16b and further disposed at least partially extend over the corresponding one of the shaft portions 18a, 18b of the cross member 18 extending upwardly through the instantaneously adjacent yoke bore 16a, 16b. This axial position of the bearing cup 11 prior to installation in the yoke 15 allows for the portion of the bearing cup 11 extending axially outside of the adjacent yoke bore 16a, 16b to form a locating feature configured for reception within the cylindrical portion 26 of the passageway 24, thereby ensuring that the cylindrical portion 26 and the adjacent yoke bore 16a, 16b are co-axially aligned for forming the continuous transition therebetween via the dual reception of the cylindrically shaped bearing cup 11 therein. The funnel tool 20 may be removably received over the exposed portion of the bearing cup 11 via manipulation by a human operator following installation of the yoke 15 relative to the mounting table 2 and associated features 3, 4 thereof.

The funnel tool 20 further includes an alignment key 30 configured for reception within a keyway 60 of the ram tool 50. The alignment key 30 is provided as a projection projecting radially inwardly from the inner surface 23 of the funnel tool 20 and includes a radially innermost surface 31 thereof that is positioned radially to be disposed radially inwardly of the inner surface 23 of the funnel tool 20 along the cylindrical portion 26 of the passageway 24, which also coincides with the radially innermost surface 31 being disposed radially inwardly of the inner surface 23 along the tapered portion 25 of the passageway 24. The alignment key 30 is shown as being a separate structure that is coupled to the funnel tool 20 via an appropriate fastener, but the alignment key 30 may be coupled to the funnel tool 20 in any manner or may be formed integrally with the remainder of the funnel tool 20 without departing from the scope of the present invention.

The alignment key 30 may extend axially along both the tapered portion 25 and the cylindrical portion 26 of the passageway 24 or may extend along the tapered portion 25 and not the cylindrical portion 26, so long as the alignment key 30 is positioned for properly aligning the funnel tool 20 relative to the ram tool 50 as described hereinafter. In the disposed embodiment, the alignment key 30 extends axially along a portion of the cylindrical portion 26 that is disposed above the closed end 12 of the bearing cup 11 prior to installation of the snap ring 13, continues to extend along the tapered portion 25, and then extends axially upwardly beyond the first end 21 of the funnel tool 20 in a direction towards the ram tool 50 (prior to initiation of the installation of the snap ring 13), wherein the portion of the alignment keyway 30 extending beyond the first end 21 may be referred to as the locating extension 38 of the alignment key 30. The locating extension 38 may be utilized to aid the human operator in determining the proper rotational position of the funnel tool 20 relative to the keyway 60 of the ram tool 50 via the relatively close axial positioning therebetween when the funnel tool 20 is rotated towards the configuration shown in FIG. 6 where the alignment key 30 and the keyway 60 have been properly aligned along a common axis parallel to the movement of the ram tool 50 relative to the funnel tool 20 to allow for reception of the alignment key 30 within the keyway 60 upon the ram tool 50 being translated downwardly relative to the position thereof shown in each of FIGS. 5 and 6. The locating extension 38 may include one or more tapered surfaces 39 that result in the locating extension 38 having a decreasing dimension in the radial direction and/or the circumferential direction of the funnel tool 20 as the locating extension 38 extends beyond the first end 21 and towards the ram tool 50 with such tapered surfaces 39 provided as a form of piloting feature for ensuring initial reception of the alignment key 30, and more specifically the locating extension 38 thereof, within the keyway 60 of the ram tool 50. Such tapered surfaces 39 may also be configured to aid in correcting any slight misalignment of the funnel tool 20 relative to the path of the ram tool 50 as the ram tool 50 is caused to move into the funnel tool 20. This occurs because each such tapered surface 39 includes an inclination relative to the axial direction of motion of the ram tool 50 such that an interaction between an axially moving surface of the ram tool 50 and one of the tapered surfaces 39 results in at least a portion of the forces acting therebetween being directed towards one of rotating the funnel tool 20 circumferentially to a properly aligned angular position and/or readjusting the inclination and/or the radial position of the funnel tool 20 to a desired co-axial configuration relative to the ram tool 50, depending on whether the interacting surfaces are tapered radially and/or circumferentially in the manner described above.

The alignment key 30 may include substantially any cross-sectional shape extended constantly in the axial direction of the funnel tool 20 that is suitable for reception within a corresponding cross-sectional shape of the keyway 60 as the ram tool 50 is moved downwardly towards the funnel tool 20, so long as the radially innermost surface 31 of the alignment key 30 extends radially inwardly beyond the inner surface 23 of the funnel tool 20 along the cylindrical portion 26 of the passageway 24 to a radial position coinciding with the pathway of the ram tool 50 through the funnel tool 20. In the provided example, the alignment key 30 includes a first lateral surface 32 and a second lateral surface 33 extending radially between the radially innermost surface 31 and the inner surface 23 of the funnel tool 20, wherein the described surfaces 31, 32, 33 cooperate to the define the cross-sectional shape of the portion of the alignment key 30 configured for reception within the keyway 60, which in the depicted example is a substantially rectangular cross-sectional shape having beveled edges, as one non-limiting example.

Figure 7:
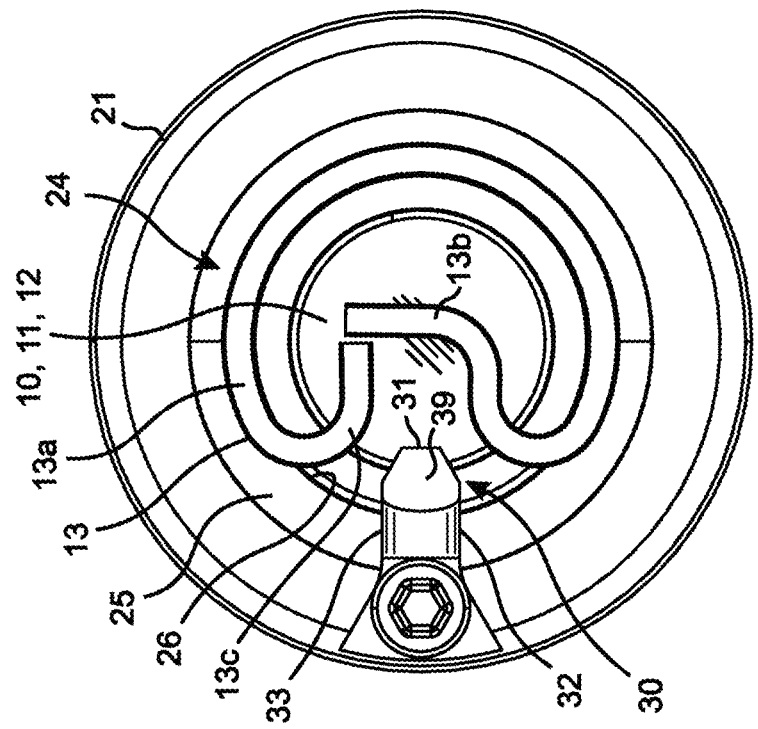
FIG. 7 is a top plan view taken from above the funnel tool when the snap ring is disposed therein, wherein the funnel tool and the snap ring are shown in isolation.
Figure 6:
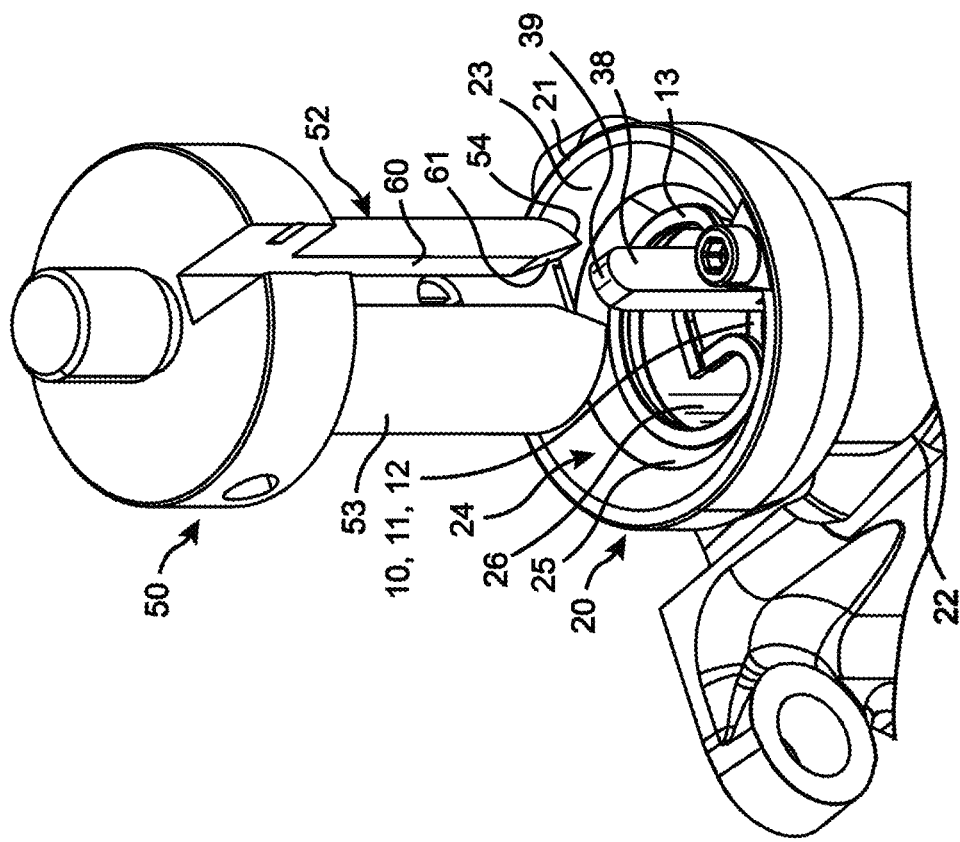
FIG. 6 is a fragmentary perspective view of the manufacturing assembly of FIG. 5 showing a ram tool, a funnel tool, and the snap ring relative to the multi-axial joint receiving the snap ring.

As can be seen in FIGS. 6 and 7, the snap ring 13 being instantaneously installed into the instantaneously adjacent yoke bore 16a, 16b may include an outer diameter along the annular or circular segment 13a thereof that is less than the inner diameter of the passageway 24 along the tapered portion 25 adjacent the first end 21 of the funnel tool 20 and greater than the inner diameter of the passageway 24 at the transition of the passageway 24 from the tapered portion 25 to the cylindrical portion 26 thereof, thereby resulting in the snap ring 13 initially resting within the tapered portion 25 at an axial position intermediate the first end 21 of the funnel tool 20 and the transition from the tapered portion 25 to the cylindrical portion 26 of the passage way 24. The end segments 13b, 13c of the snap ring 13 are bent radially inwardly away from the circular arc of the annular or circular segment 13a such that the end segments 13b, 13c cooperate to form a radially inwardly extending opening configured to be radially aligned with the alignment key 30, thereby ensuring that an orientation of the snap ring 13 upon installation into the yoke 15 is predetermined and thus known when attempting to replace and/or service the snap ring 13 and/or a component retained by the snap ring 13.

The radial alignment of the alignment key 30 and the opening formed by the cooperation of the end segments 13b, 13c may include the alignment key 30 extending at least partially radially inwardly to a position between the two bent end segments 13b, 13c to aid in properly rotating the snap ring 13 to the illustrated rotational configuration, as may be performed via hand manipulation by a human operator. As explained in greater detail hereinafter, the snap ring 13 being at the disclosed rotational configuration relative to the ram tool 50 is also relevant in ensuring that the ram tool 50 interacts with the snap ring 13 in a desired fashion upon the snap ring 13 reaching the corresponding retention groove 17a, 17b and attempting to resiliently spring back towards the expanded configuration shown in FIG. 7 in accordance with a primary objective of the present invention.

Referring now to FIGS. 8 and 9, the ram tool 50 includes an axially extending and substantially cylindrical stem 52 configured for removable reception within each of the passageway 24 of the funnel tool 20 and the instantaneously adjacent yoke bore 16a, 16b of the yoke 15 during the process of installing one of the snap rings 13 in the manner described. As such, the stem 52 of the ram tool 20 includes a central axis thereof that is arranged co-axial relative to each of a central axis of the funnel tool 20, a central axis of the bearing cup 11, and a central axis of the instantaneously adjacent yoke bore 16a, 16b when the manufacturing assembly 101 is in the configuration shown in FIG. 5. The stem 52 is also provided to include an outer diameter along an outer circumferential surface 53 thereof that is substantially equal to, but slightly smaller than, the inner diameter of each of the cylindrical portion 26 of the passageway 24 and the inner diameter of the instantaneously adjacent yoke bore 16a, 16b, thereby facilitating axial reception of the stem 52 within each of the cylindrical portion 26 and the adjacent yoke bore 16a, 16b with a relatively small radial clearance present therebetween.

The previously mentioned keyway 60 of the ram tool 50 is provided as an indentation, groove, or opening extending radially inwardly into the stem 52 relative to the otherwise cylindrical shape thereof with the corresponding indentation, groove, or opening having a cross-sectional shape allowing for the reception of the alignment key 30 of the funnel tool 20 therein, which may include the keyway 60 having a substantially similar or complimentary shape relative to the alignment key 30. In the provided example, the keyway 60 includes a substantially rectangular cross-sectional shape extending radially inwardly into the outer circumferential surface to include three adjacent surfaces substantially corresponding to the surfaces 31, 32, 33 of the alignment key 30. As mentioned above, alternative cross-sectional shapes may be utilized with respect to the pairing of the alignment key 30 and the keyway 60 in comparison to the example shown so long as the corresponding interactions present between the facing and potentially engaging surfaces of the alignment key 30 and the keyway 60 prevent undesired rotation and/or radial movement of the funnel tool 20 relative to the yoke 15 and/or the ram tool 50 during the process of installing one of the snap rings 13. The cross-sectional shape of the keyway 60 may be constant as the keyway 60 extends in the axial direction of the stem 52. The keyway 60 extends axially away from a downwardly disposed distal surface 54 of the stem 52 and extends along an axial length of the ram tool 50 suitable for reception of the alignment key 30 therein with respect to a full extension of the ram tool 50 into the instantaneously adjacent yoke projection 15a, 15b.

As best shown in FIG. 6, the keyway 60 may further include a tapered mouth 61 at the distal surface 54 of the stem 52 as another piloting feature for ensuring a desired position and orientation of the funnel tool 20 relative to the ram tool 50 upon entry of the ram tool 50 therein. The tapered mouth 61 is shown as including an enlarged rectangular cross-sectional shape at the distal surface 54 of the stem 52 in comparison to the constant rectangular cross-sectional shape of the remainder of the keyway 60 extending axially from an inner end of the tapered mouth 61. A width of the tapered mouth 61 decreases in what may either be considered a circumferential direction of the stem 52 or a tangential direction of the circumferential surface 53 of the stem 52 at the angular position of the keyway 60 as the tapered mouth 61 extends away from the distal surface 54 and eventually intersects the portion of the keyway 60 having the constant cross-sectional shape. As mentioned above in describing the tapered surfaces 39 of the locating extension 38, the tapering of the mouth 61 aids in delivering a component of an interaction force between the locating extension 38 and the surfaces defining the keyway 60 in the circumferential/tangential direction of the funnel tool 20 to further facilitate a slight correction of the orientation of the funnel tool 20 as the ram tool 50 progresses towards and into the passageway 24 thereof.

As shown schematically in FIG. 5, the ram tool 50 is associated with a drive mechanism 99 configured to move the ram tool 50 in the axial direction thereof towards or away from the mounting table 2, wherein the drive mechanism 99 provides the necessary axial forces for facilitating the installation of one of the snap rings 13 as shown and described herein. The drive mechanism 99 may be any linear drive actuator or mechanical press suitable for generating the necessary forces and for causing the reciprocating motion of the ram tool 50 along the designated axis, and may be powered hydraulically, pneumatically, electrically, or the like, as desired, without departing from the scope of the present invention.

The ram tool 50 may be configured to be positioned above the yoke 15 prior to each installation process such that the funnel tool 20 is able to be properly located relative to the instantaneously adjacent yoke projection 15a, 15b without interfering with the ram tool 50. As mentioned above, the initial vertical position of the ram tool 50 may also be selected to ensure that the alignment of the funnel tool 20 can be readily achieved by positioning a feature of the funnel tool 20, such as the locating extension 38 thereof, adjacent a portion of the stem 52 having the keyway 60 formed therein such that a visual inspection may be performed by a human operator in determining whether the funnel tool 20 is properly positioned and oriented relative to the ram tool 50. The proper positioning and orienting of the funnel tool 20 may include the human operator assuming that the ram tool 50 will perform any slight corrections to the position and orientation of the funnel tool 20 during the installation process as a result of the interactions present between the tapered locating/piloting features 39, 61 described above such that the funnel tool 20 may be positioned and/or oriented along a small range of suitable positions/orientations while still achieving a desirable installation of one of the snap rings 13.

Referring now to FIGS. 8 and 9, the ram tool 50 includes a snap ring expansion assembly 70 disposed at the distal surface 54 of the stem 52, wherein the snap ring expansion assembly 70 is configured to apply a radially outwardly extending force to the annular or circular segment 13a of the snap ring 13 at one or more circumferential positions therealong during reception of the snap ring 13 within the corresponding retention groove 17a, 17b in a manner promoting full expansion of the snap ring 13 therein. The expansion assembly 70 comprises a fastener 71, a retention element 72, a plurality of engagement elements 80, and a recessed portion 55 of the stem 52 receiving the remaining components 71, 72, 80 of the assembly 70 therein.

The recessed portion 55 of the stem 52 is formed to be recessed relative to the distal surface 54 thereof and with respect to the axial direction thereof. In the provided example, the distal surface 54 of the stem 52 is formed to be substantially planar and extends radially inwardly relative to the outer circumferential surface 53 of the stem 52 about a periphery thereof with the exception of the angular position along which the keyway 60 is present. The recessed portion 55 of the stem 52 is divisible into a plurality of engagement element sockets 56, a flange receiving opening 57, a first fastener receiving opening 58, and a second fastener receiving opening 59. When progressing radially inwardly from a periphery of the stem 52, the flange receiving opening 57 is recessed axially inwardly relative to the distal surface 54 of the stem 52, the first fastener receiving opening 58 is recessed axially inwardly relative to the surrounding flange receiving opening 57, and the second fastener receiving opening 59 is recessed axially inwardly relative to the surrounding first fastener receiving opening 58.

The plurality of the engagement element sockets 56 includes the sockets 56 arranged in an annularly extending array extending along a circular arc of less than 360 degrees with each of the sockets 56 spaced apart angularly from an adjacent one of the sockets 56 with respect to a central axis of the stem 52. In the present embodiment, the array includes seven of the engagement element sockets 56 with a center of each of the sockets 56 angularly displaced from the center of each circumferentially adjacent socket 56 by about 40 degrees of angular displacement, thereby resulting in the total array extending along about (but slightly greater than) 240 degrees of angular displacement around the central axis of the stem 52. The angular positions devoid of the engagement sockets 56, which would corresponding to two of the nine angular positions according to the present configuration of equal 40 degree angular spacings, are positioned to correspond to the diametric side of the distal surface 54 along which the keyway 60 is formed, and more specifically the enlarged mouth 61 thereof. These positions also correspond to the positions at which the properly located snap ring 13 is devoid of the annular or circular segment 13a thereof as a result of the inward bending of the end segments 13b, 13c to deviate from the annular or circular configuration of the remainder of the snap ring 13. It should be understood that a different number of sockets 56 having different angular spacings therebetween may be utilized in accordance with the present invention without necessarily departing from the scope of the present invention.

Each of the engagement element sockets 56 is positioned to include a radially outer portion of a periphery thereof (relative to a central axis of the stem 52) bordering the peripherally disposed distal surface 54 of the stem 52 and a radially inner portion of the periphery thereof bordering the flange receiving opening 57 towards a central region of the stem 52. Each of the sockets 56 includes at least a concave spherical surface 56a indented axially into the stem 52 with a maximum diameter across each such spherical surface 56a being arranged substantially perpendicular to the axial direction of the stem 52. As used herein, a spherical surface refers to a surface having a shape conforming to at least a portion of a sphere of a given radius/diameter, and does not necessarily refer to a surface covering an entire sphere. Each of the spherical surfaces 56a may be hemispherical (extending through 180 degrees of angular displacement) or slightly smaller than hemispherical (such as extending through about 170-175 degrees of angular displacement). In the present embodiment, each of the sockets 56 further includes an axially extending surface 56b connecting the spherical surface 56a to the axially spaced apart distal surface 54 of the stem 52 along the radially outer portion of the periphery of each respective socket 56, whereas the radially inner portion of the periphery of each of the sockets 56 transitions from the spherical surface 56a to a surface of the stem 52 defining the flange receiving opening 57.

Each of the engagement elements 80 of the presently disclosed embodiment is a spherical ball having a radius/diameter corresponding to the radius/diameter of the spherical surface 56a of each of the sockets 56 such that the outer surface of each respective engagement element 80 substantially conforms directly to the corresponding spherical surface 56a in which it is received with half or slightly greater than half of the engagement element 80 projecting axially outside of the spherical surface 56a. Each of the retention elements 80 may be formed from a relatively hard material such as steel and associated alloys thereof, such as the 5100 series of steel. However, substantially any material having the necessary durability and strength may be utilized in accordance with the present disclosure.

The retention element 72 includes a flanged portion 75 and a fastener engaging portion 82, each of which may be substantially cylindrical in shape. The flanged portion 75 includes a size and shape for reception within the flange receiving opening 57 while the fastener engaging portion 82 includes a size and shape for reception within the first fastener receiving opening 58. An outer circumferential surface 76 of the flanged portion 75 includes the otherwise cylindrical shape thereof interrupted by the inclusion of each of a truncated surface 77 and a plurality of retention surfaces 78.

The truncated surface 77 of the flanged portion 75 includes a segment of the otherwise circular profile shape of the cylindrical flanged portion 75 removed therefrom to form an open space along the periphery of the flanged portion 75 corresponding to the shape and configuration of the keyway 60 at the distal surface 54 of the stem 52, which is configured to be axially aligned with the truncated surface 77 upon reception of the flanged portion 75 within the flange receiving opening 57. In the present embodiment, the truncated surface 77 includes a planar configuration configured to be continuous with a base surface of the enlarged and tapered mouth 61 of the keyway 60, but in other embodiments the truncated surface 77 may match and be directed continuous with the configuration of the constant cross-section of the keyway 60 when such a tapered mouth 61 is not employed at the end of the keyway 60 in the manner shown. The truncated surface 77 may include alternative configurations in accordance with differing cross-sectional shapes of the keyway 60 so long as all components interact with one another in the manner described herein.

Each of the retention surfaces 78 is positioned angularly along the outer circumferential surface 76 of the flanged portion 75 to correspond to an angular position of one of the engagement element sockets 56 (with respect to the central axis of the stem 52) when the retention element 72 is received within the recessed portion 55 of the stem 52. Each of the retention surfaces 78 includes a configuration that extends radially inwardly with respect to a central vertical axis through the corresponding spherical engagement element 80 to a position that is axially distal to, facing axially upwardly towards, and axially engaging a surface along an underside of the corresponding engagement element 80 such that the engagement element 80 is constrained from movement relative to the stem 52 or the flanged portion 75 of the retention element 72. Specifically, the retention surface 78 must extend to engage the spherical engagement element 80 at an angular position therealong that, in cooperation with the spherical surface 56a of the corresponding socket 56, engages the engagement element 80 at positions spaced apart angularly by greater than 180 degrees therealong with respect to at least one plane arranged parallel to the axial direction of the stem 52, such as a plane extending radially outwardly from a central axis of the stem 52. In the present example, an axially distal surface of each of the retention surfaces 78 is disposed to engage the underside of the corresponding one of the engagement elements 80 at a position displaced angularly about 20-30 degrees from the periphery of the spherical surface 56a along the same vertically arranged plane, thereby ensuring that the spherical surface 56a and the retention surface 78 extend about 190-205 degrees around the corresponding spherical engagement element 80.

In some embodiments, each of the retention surfaces 78 may be inclined to include a constant taper, such as each of retention surfaces 78 being formed by a frustoconical surface that is axially symmetric about a central and vertically extending axis through the corresponding spherical engagement element 80. Such a frustoconical surface may extend circumferentially around the radially inner disposed portion of the periphery/circumference of the corresponding engagement element 80 such that at least a portion of each of the retention surfaces 78 extends axially and radially for engaging the engagement element 80 along an underside thereof. In other embodiments, each of the retention surfaces 78 may include a concave and spherical shape corresponding to the shape of a minor portion of a sphere having the same radius of curvature as each of the engagement elements 80, and thus the same radius of curvature as the spherical surface 56a of each of the sockets 56. This spherical shape of each of the retention surfaces 78 may be arranged to be spherically continuous with the radially inwardly disposed portion of the periphery of an axially aligned one of the spherical surfaces 56a when the flanged portion 75 is received in the flange receiving opening 57. In either case, the retention surface 78 is positioned axially and radially to prevent undesired movement and/or removal of the associated one of the engagement elements 80 during operational use of the manufacturing assembly 101 via the interference provided thereby in the designated direction of removal of the engagement elements 80 from the ram tool 50, which is the axial downward direction in this example.

As shown in FIG. 9, each of the retention surfaces 78 may engage the underside of the corresponding one of the engagement elements 78 at a position corresponding to a desired degree of angular displacement relative to the plane of the maximum diameter across each of the spherical surfaces 56a to result in a desired portion of the corresponding engagement element 80 extending axially outwardly (downwardly as depicted) beyond the flanged portion 75 of the retention element 72. In the present embodiment, the retention surface 78 engages the underside of the engagement element 80 at a position resulting in a distal surface of the flanged portion 75 being substantially coplanar with the distal surface 54 of the stem 52. However, alternative configurations of the retention surfaces 78 relative to the engagement elements 80 may be utilized without necessarily departing from the scope of the present invention.

The fastener 71 may have the general configuration of a bolt and may thus include a head 73 and a threaded stem 74. The threaded stem 74 is cylindrical in shape, includes a smaller diameter than the head 73, and extends axially therefrom. The head 73 includes structure for engaging a rotational tool configured to rotate the fastener 71 in either of two opposing rotational directions for installing or removing the fastener 71 from the expansion assembly 70.

The retention element 72 includes a fastener head receiving opening 83 formed therein that extends through the flanged portion 75 and a portion of an axial length of the fastener engaging portion 82 as well as a fastener. The retention element 72 also includes a stem receiving through-hole 84 that extends axially through the fastener engaging portion 82. The fastener head receiving opening 83 may be cylindrical in shape and may include an axial depth sufficient to fully receive the head 73 of the fastener 71 therein such that the head 73 does not project axially beyond the retention element 72 in the distal direction of the ram tool 50 and such that the head 73 may rotate during an installation of removal of the fastener 71. The fastener head receiving opening 83 and the fastener stem receiving through-hole 84 cooperate to form an opening penetrating axially through the retention element 72 to allow for passage of the threaded stem 74 of the fastener 71 therethrough and into the second fastener receiving opening 59 of the recessed portion 55 of the stem 52. The second fastener receiving opening 59 is cylindrical in shape and is defined by an inner surface that is threaded to be complimentary to the thread on the outer surface of threaded stem 74.

As shown in FIG. 8, the expansion assembly 70 is assembled by first axially inserting each of the engagement elements 80 into a corresponding socket 56 such that a portion of each of the engagement elements 80 extends axially beyond the distal surface 54 of the stem 52, wherein the axially extending portion of each of the engagement elements 80 may be slightly less than hemispherical, such as the axially extending portion extending across about 140-160 degrees of angular displacement along the corresponding spherically shaped engagement element 80. Once the engagement elements 80 are received in the sockets 56, the retention element 72 is axially inserted into the recessed portion 55 of the stem 52 to include the fastener engaging portion 82 received within the first fastener receiving opening 58 and the flanged portion 75 received within the flange receiving opening 57. The insertion of the retention element 72 into the flange receiving opening 57 results in the alignment of each of the retention surfaces 78 with the underside of a corresponding one of the engagement elements 80 to maintain the axial and radial positions thereof relative to the stem 52. Next, the fastener 71 is received into the retention element 72 and the recessed portion 55 of the stem 52 to include the head 73 of the fastener 71 disposed within the fastener head receiving opening 83 and the threaded stem 74 disposed through the fastener stem receiving through-hole 84 and threadably engaging the threads of the second fastener receiving opening 59. Rotation of the fastener 71 via an appropriate rotational tool results in continued threading between the threaded stem 74 and the second fastener receiving opening 59 until the head 73 of the fastener applies an axial force to the fastener receiving portion 82 of the retention element 72 to prevent undesired movement of the retention element 72 and/or the engagement elements 80 relative to the stem 52.

The snap ring 13 is positioned appropriately within the tapered portion 26 of the funnel tool 20 relative to the radial inward projection of the alignment key 30 to ensure that the engagement elements 80 engage the annular or circular segment 13a of the snap ring 13 at designated angular positions while also preventing undesired interactions with the inwardly bent end segments 13b, 13c. Additionally, the funnel tool 20 is rotated to a desired rotational position around the bearing cup 11 extending axially outside of the corresponding and instantaneously adjacent yoke bore 16a, 16b to ensure that the alignment key 30 is axially received within the keyway 60 of the ram tool 50 for again assuring a proper positioning of the engagement elements 80 relative to the funnel tool 20, and thus the snap ring 13 disposed therein.

As explained throughout the present disclosure, the process of axially installing one of the snap rings 13 includes the ram tool 50 causing the radial inward constriction of the snap ring 13 during axial passage of the ram tool 50 through the tapered portion 25 of the funnel tool 20 as the drive mechanism 99 causes the ram tool 50 to move axially downwardly towards the bearing cup 11. Eventually the snap ring 13 is constricted enough to start passing through the cylindrical portion 26 of the funnel tool 20 as well as the cylindrically shaped yoke bore 16a, 16b instantaneously arranged to be continuous with the cylindrical portion 26. As shown in FIG. 9, which is a fragmentary view cross-sectional view showing an interaction of the ram tool 50 with the snap ring 13 during passage of the snap ring 13 through the either of the yoke bore 16a bores 16a, 16b immediately prior to the snap ring 13 reaching the axial position of the corresponding retention groove 17a, 17b, the outer circumferential surface 53 of the stem 52 is closely received within the cylindrical portion 26 of the funnel tool 20 and the continuously arranged yoke bore 16a, 16b while the annular or circular segment 13a of the snap ring 13 is attempting to resiliently spring back to an enlarged configuration such that the annular or circular segment 13a is pressing radially outwardly along the surface of the yoke 15 defining the yoke bore 16a, 16b.

When at the configuration shown in FIG. 9, it can be seen that a radially outwardly disposed (relative to the central axis of the stem 52) surface of the spherical engagement element 80 engages an axially upwardly disposed and radially inwardly disposed portion (corner) of the rectangular cross-sectional shape of the annular or circular segment 13a of the snap ring 13 during the passage of the snap ring 13 through the corresponding yoke bore 16a, 16b. The corner of the annular of circular segment 13a may be formed at an intersection of an upper facing surface and an inner circumferential surface of the snap ring 13. The spherical shape of the engagement element 80 results in the radially outwardly disposed half of the engagement element 80 (relative to the central axis of the stem 52) having a varying inclination relative to the axial direction of movement of the ram tool 50 into the corresponding yoke bore 16a, 16b, wherein an axially distal point/surface of the engagement element 80 is arranged perpendicular to the axial direction of movement and a radially outermost surface of the axially exposed portion of the engagement element 80 is almost entirely arranged in the axial direction of movement, such as being at only about a 10-20 degrees incline relative to the axial direction of movement. The radially outer half of the engagement element 80 accordingly includes a convex and varying taper with respect to each of the axial direction and the radial direction of the stem 52, wherein the described taper includes the surface of the engagement element 80 configured to engage the annular or circular segment 13a of the snap ring 13 having a decreasing radius (relative to the central axis of the stem 52) when progressing in the axially distal direction of the ram tool 50 towards the axially distalmost surface/point along each spherically shaped engagement element 80.

The taper present along the engaging surface of each such engagement element 80 results in a reaction force present between the annular or circular segment 13a of the snap ring 13 and the engaging surface of the corresponding engagement element 80 being directed at an incline relative to the axial direction of movement of the ram tool 50 with the direction of the force corresponding to a direction of extension of an axis extending from the center of the spherical engagement element 80 to the point of contact between the engagement surface and the snap ring 13. When this point of contact is angularly displaced from the axially distalmost point/surface of the engagement element 80, the reaction force will be oriented to be partially in the axial direction of movement of the ram tool 50 and partially in the radial direction of the stem 52 such that the engagement surface of the engagement element 80 tends to press the snap ring 13 both axially downwardly along the direction of movement of the ram tool 50 as well as radially outwardly (relative to the central axis of the stem 52) towards a position of the radially outwardly disposed retention groove 17a, 17b, wherein the radial outward component of the reaction force increases and the axial component of the reaction force decreases as the point of contact present between the snap ring 13 and the engagement element 80 progresses in the radial outward direction of the stem 52, which also corresponds to progression in an axial direction along the engagement element 80 away from the axially distalmost point/surface thereof, whereas the axial component of the reaction force decreases in response to the same progression in the described radial and axial directions.

In the present embodiment, the point of contact initially present between the snap ring 13 and each of the engagement elements 80 when the snap ring 13 is still constricted within the corresponding yoke bore 16a, 16b is displaced about 20-30 degrees from the axially distal point/surface of the axially exposed portion of the engagement element 80, thereby resulting in the reaction force present therebetween also being at about a 20-30 degree incline relative to the axial direction of movement of the ram tool 50 to cause the ram tool 50 to apply a greater axial force than radial force to the snap ring 13 at each respective point of contact. However, once the snap ring 13 is pressed axially to a position where the snap ring 13 has passed by a radially extending surface 97 of the retention groove 17a, 17b defining an axially uppermost surface thereof, the snap ring 13 is able to start to expand radially outwardly towards an axially extending surface 98 of the retention groove 17a, 17b defining a radially outermost surface thereof while the point of contact present between the engagement element 80 and the snap ring 13 progressively moves to positions along the engagement element 80 having a greater angular displacement relative to the axially distal point/surface thereof. This progression results in the radially outwardly directed component of the reaction force applied by the engagement element 80 progressively increasing and an axially downwardly directed component of the reaction force applied by the engagement element 80 progressively decreasing during the expansion of the snap ring 13 into the retention groove 17a, 17b and continued progression of the ram tool 50 in the axial downward direction.

Figure 10:
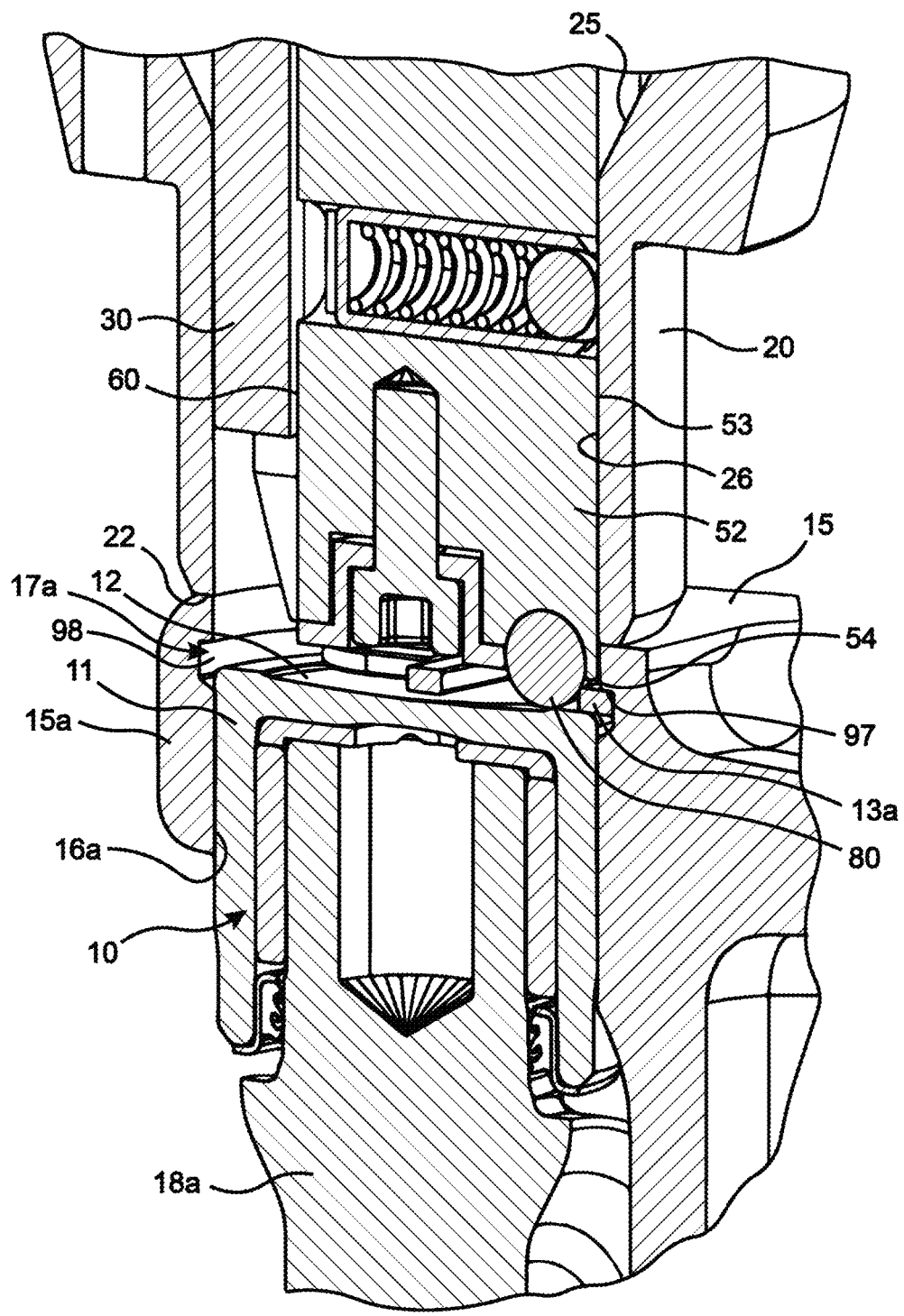
FIG. 10 is a perspective cross-sectional view of the manufacturing assembly of FIG. 5 as taken along a plane passing through a central axis thereof, wherein the manufacturing assembly is shown immediately following the expansion of the snap ring into a retention groove formed along the bore of the yoke.

As can be seen in FIG. 10, which shows the snap ring 13 as fully expanded into the retention groove 17a indicating a proper installation of the snap ring 13 and the corresponding bearing assembly 10 into the respective yoke bore 16a, 16b, the final point of contact present between the snap ring 13 and each of the engagement elements 80 may be displaced about 60 degrees from the axially distal point/surface along the engagement element 80 such that the radial component of the reaction force is greater than the axial component thereof. However, in other embodiments, alternative angles of inclination at this stage may be utilized without departing from the scope of the present invention, so long as the forces are applied both axially downwardly and radially outwardly for encouraging installation of the snap ring 13 in the manner described.

Figure 11:
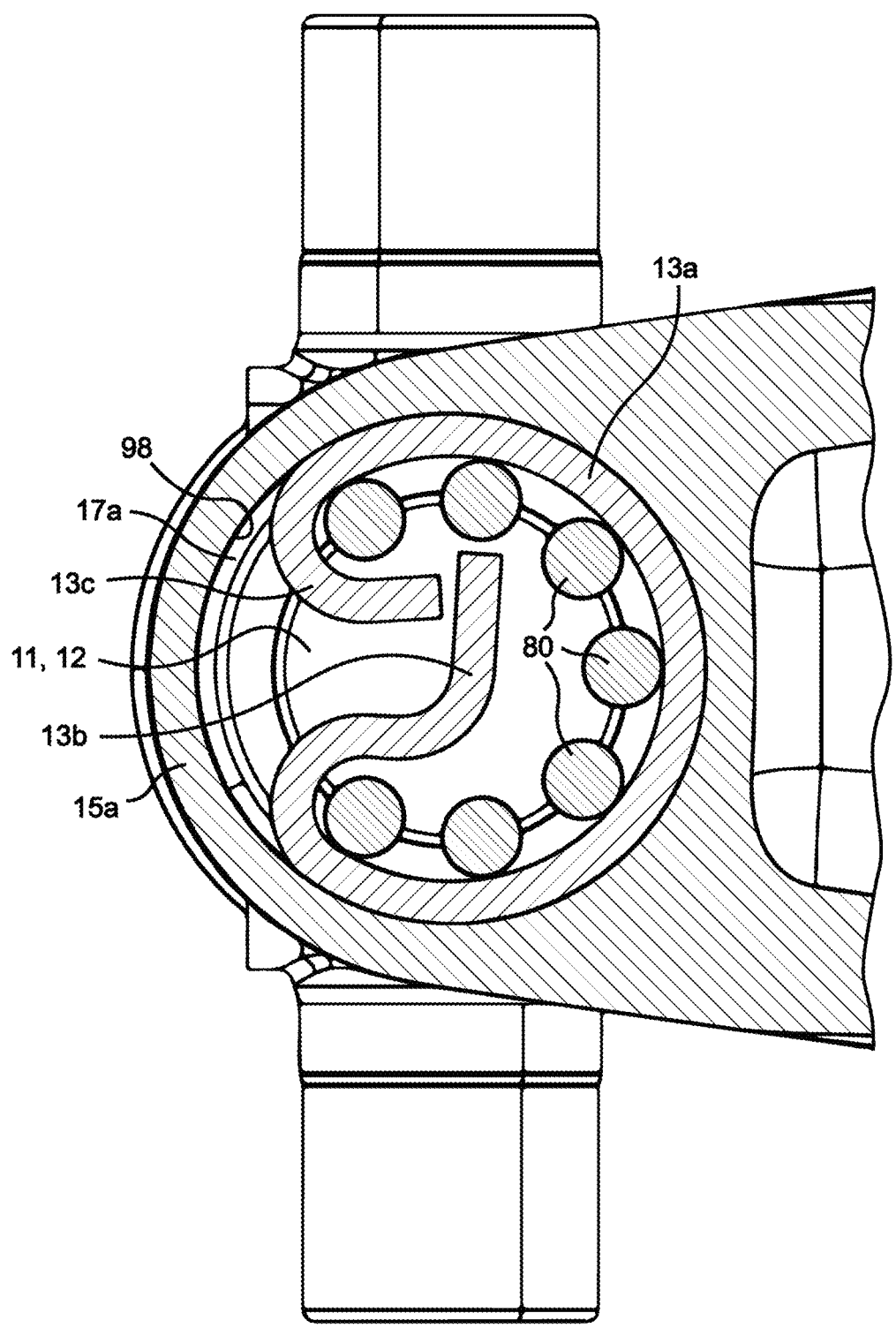
FIG. 11 is a cross-sectional view taken along a plane perpendicular to the axial direction of the manufacturing assembly and at an axial position where a plurality of engagement elements of the ram tool are contacting the snap ring at a plurality of circumferential positions therealong when the manufacturing assembly is in the configuration of FIG. 10.

Additionally, as can be seen in FIG. 11, which illustrates a downwardly directed cross-sectional view of the manufacturing assembly 101 along a plane of contact between the annular or circular segment 13a of the snap ring 13 and each of the engaging surfaces of the array of the engagement elements 80, each of the angularly displaced engagement elements 80 along the annular array presses radially outwardly on a corresponding angular position along the annular or circular segment 13a while each of the engagement elements 80 is also positioned to not interfere with the inwardly bent end segments 13b, 13c of the snap ring 13 or the motions thereof during the expansion of the snap ring 13. to its original configuration. A full expansion of the snap ring 13 may accordingly include the annular or circular segment 13a thereof conforming to the cylindrical shape of the axially extending surface 98 along a circumferential length of the annular or circular segment 13a in a manner preventing undesired dislodging or removal of the snap ring 13. The snap ring 13 is also disposed to extend radially inwardly into the yoke bore 16a such that the bearing cup 11 cannot move axially outwardly beyond the snap ring 13.

The process of axially pushing the snap ring 13 to the designated axial position accordingly results in the ram tool 50 actively aiding the annular or circular segment 13a of the snap ring 13 in expanding radially outwardly back towards an original configuration thereof while also reducing the axial forces present between the engagement elements 80 and the annular or circular segment 13a that could potentially lead to the formation of frictional forces that could potentially lead to a seizure of the snap ring 13, and hence only a partial expansion into the retention groove 17a. As noted throughout, this feature of the ram tool 50 may be most beneficial in installing the secondary snap ring 13 where the axially extending component of the reaction forces present between the snap ring 13 and the engagement elements 80 is relatively higher than the initial installation of the first snap ring 13 due to the lack of axial movement of the components 10, 18 of the Cardan joint relative to the already installed and axially delimiting snap ring 13 disposed within the first retention groove 17a.

The use of removably replaceable and/or repositionable spherical engagement elements 80 provides numerous advantages over alternative structures otherwise capable of acting as the engagement elements 80 in providing a similar tapered shape and thus a similarly radially outwardly directed force to the snap ring 13. First, spherical metallic balls are readily available and thus can be selected for use in the ram tool 50 absent the need to machine or manufacture complex structures specifically configured for use with the ram tool 50 and the associated expansion assembly 70 thereof. That is, the engagement elements 80 can be selected from existing metallic balls formed from a desired material and having a desired radius/diameter to facilitate the relationships disclosed herein. Second, the use of the retention element 72 and fastener 71 in maintaining the position of the array of the engagement elements 80 allows for the selective replacement of one or more of the engagement elements 80 as the engagement elements 80 encounter wear or damage following repeated cycles of snap ring installation, as opposed to the engagement elements 80 being integrally formed features of the stem 52 that lead to the degradation of the entirety of the ram tool 50 upon such wear or damage accumulating on individual ones of the engagement elements 80.

In addition to removing and replacing worn or damaged engagement elements 80, the use of a spherical surface 56a along each pocket 56 further allows for a rotational repositioning (rolling) of one or more of the engagement elements 80 within the corresponding socket 56 such that any worn or damaged surfaces of the engagement elements 80 are no longer positioned to make contact with the snap ring 13 in a manner that could compromise the ability to aid in expanding the snap ring 13 or that could lead to wear or damage of the snap ring 13 itself. Third, the use of the annular array of the spherical engagement elements 80 in contacting the annular or circular segment 13a of the snap ring 13 aids in reducing the contacting surfaces capable of generating relatively high frictional forces therebetween such that seizure of the expansion of the snap ring 13 is prevented, as is evident in showing the point contacts between the engagement elements 80 and the snap ring 13 in FIG. 11 as is present when engaging a spherical surface in the manner described.

Although the use of the spherical engagement elements 80 is beneficial as described above, the present invention is not necessarily limited to the engagement elements 80 being provided in this form. As noted above, alternative structures having a similar positioning and orientation of the engaging tapered surface thereof relative to the central axis of the stem 52 may be employed in accordance with the present disclosure without departing from the scope of the present invention. For example, FIGS. 12 and 13 illustrate alternative embodiments of engagement elements 180, 280 that may be removably received within corresponding sockets, slots, or other openings forming a portion of the recessed portion 55 of the stem 52 in similar fashion to the disclosed spherical balls while providing the axial and radial forces to the snap ring 13 in the manner described herein.

Figure 12:
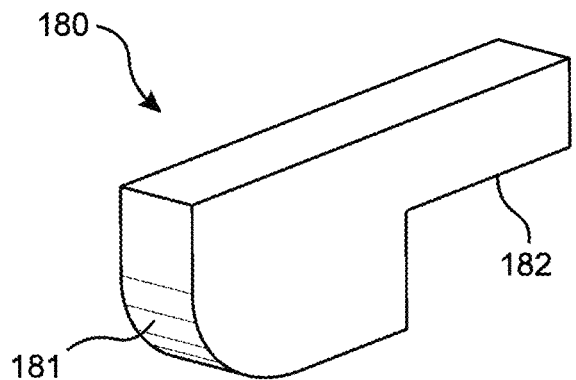
FIG. 12 is a perspective view of an engagement element for use with the ram tool of the manufacturing assembly of FIG. 5 according to another embodiment of the present invention, wherein the engagement element is a plate-like insert having an arcuate tapered surface.

In FIG. 12, each such engagement element 180 is provided as ana plate-like insert having an arcuate surface 181 providing a variable taper in the same fashion as one of the spherical balls, wherein the arcuate surface 181 is provided to be radially outwardly disposed relative to the central axis of the stem 52 and to also extend axially outwardly from the stem 52 to expose the arcuate surface 181 in a manner facilitating engagement with the snap ring 13. The engagement element 180 may also include a retention portion 182 configured to be compressed between a corresponding and removable retention element (not shown) and a surface along the axially distal end of the stem 52 in similar fashion to the manner in which the spherical engagement elements 80 are retained by the retention element 72. Each such engagement element 180 may be angularly positioned about the stem 52 in similar fashion to each of the spherical engagement elements 80 as depicted in FIG. 11, such as including seven of the engagement elements 180 to be radially outwardly extending at equal 40 degree angular displacements therebetween relative to the central axis of the stem 52, although alternative numbers and spacings of the engagement elements 180 may be utilized, as desired.

Figure 13:
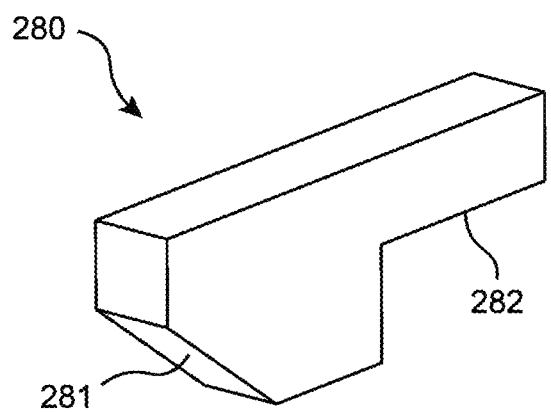
FIG. 13 is a perspective view of an engagement element for use with the ram tool of the manufacturing assembly of FIG. 5 according to yet another embodiment of the present invention, wherein the engagement element is a plate-like insert having a constantly tapered surface.

In FIG. 13, the engagement element 280 is substantially identical to the engagement element 180 with the exception of the formation of a constantly tapered surface 281 in place of the variably tapered surface formed by the arcuate surface 181 of FIG. 12. That is, the engagement element 280 may still be configured to apply both a radially outwardly and a downwardly axial force to the snap ring 13, but the radial and axial components of such a force may include the same ratio at all times due to the lack of a differing incline along the tapered surface 281 engaging the snap ring 13. The engagement element 280 may be provided as a removable insert in the same fashion as the engagement element 180 and may similarly include a retention portion 282 configured to be compressed between a corresponding and removable retention element (not shown) and a defining surface along the axially distal end of the stem 52.

Each of the tapered shapes disclosed in FIGS. 12 and 13 may also be utilized in forming a single circumferentially extending engagement element (not shown) that extends circumferentially around a periphery of the stem 52 to correspond to those positions suitable for engaging the annular or circular segment 13a of the snap ring 13, rather than providing a plurality of individually replaceable inserts 80, 180, 280. For example, with reference to FIG. 11, each of the tapered shapes may be extended circumferentially through an angle of about 240 degrees around the central axis of the stem 52 to correspond to the full angular extension of the array of the seven spherical engagement elements 80 within a single structure that is removably coupled to the stem 52, such as by use of a structure similar to the retention element 72. Such a single circumferentially extending engagement element 80 may be substantially fan-shaped from the perspective shown in FIG. 11, wherein said fan shape may extend along the illustrated positions of the engagement elements 80.

As a final alternative, it is conceivable that the ram tool 50 may include the axially distal end of the stem 52 thereof being formed to have the desired taper along a corresponding surface thereof and at the necessary angular/circumferential positions therealong, which may include the stem 52 being shaped to include the structure of any of the disclosed engagement elements 80, 180, 280 projecting axially outwardly from the axially distal end of the stem 52 in a monolithic or integral fashion, although this configuration does not allow for ease or replacement or repair to the ram tool 50 in comparison to the use of removable and replaceable components as described herein.

The manner in which the funnel tool 20 and the ram tool 50 compliment each other in properly orienting the snap ring 13 according to the configurations of features such as the key 30, the keyway 60, and the shape of the array of the engagement elements 80 provides an additional benefit in properly inspecting each snap ring 13 installation and potentially taking corrective action in the rare event that a snap ring 13 is not fully expanded into the corresponding retention groove 17a, 17b (despite the advantageous features of the present invention). Each snap ring 13 installed in such a yoke bore 16a, 16b is visible through the corresponding yoke bore 16a, 16b such that a human operator may directly view the installed snap ring 13 to determine if it has fully expanded in a desirable manner, or may facilitate the ability to take an image through the corresponding yoke bore 16a, 16b from a common perspective that can then be evaluated by either a human operator or by appropriate computer software to similarly determine whether full and desirable expansion of the snap ring 13 has occurred. In any of these variations, the snap ring 13 having the same orientation with respect to all installations thereof beneficially allows any such evaluation, whether performed by a human or performed automatically by computing means, to be conducted more easily as a result of all features of a fully and desirably installed snap ring 13 always looking substantially the same from the provided viewpoint. That is, no alternations or transformations of the viewing perspective, such as rotating the joint or the image to a desired and easily recognizable configuration, is necessary for performing such an evaluation.

This consistency of orientation of the snap ring 13 also aids in the rare event that a snap ring 13 is improperly installed into a retention groove 17a, 17b. This is true because the relevant corrective actions, such as use of the previously mentioned hammer and chisel to finalize the installation process, may be performed via a human operator while always utilizing the same approach and methodology, as opposed to having to approach the joint from a variable direction in accordance with the rotational configuration of the snap ring 13 relative to the remainder of the yoke 15. This same consistency of the orientation of the snap ring 13 also aids in servicing, repairing, or replacing any components of the associated joint since the process of removing the snap ring 13 may be performed in the same manner each time due to the predictability of the orientation of the snap ring 13.

Each of the tapered shapes disclosed in FIGS. 12 and 13 may also be utilized in forming a single circumferentially extending engagement element (not shown) that extends circumferentially around a periphery of the stem 52 to correspond to those positions suitable for engaging the annular or circular segment 13a of the snap ring 13, rather than providing a plurality of replaceable inserts 80, 180, 280. For example, with reference to FIG. 11, each of the tapered shapes may be extended circumferentially through an angle of about 240 degrees around the central axis of the stem 52 to correspond to the full angular extension of the array of the seven spherical engagement elements 80 within a single structure that is removably coupled to the stem 52, such as by use of a structure similar to the retention element 72.

As a final alternative, it is conceivable that the ram tool 50 may include the stem 52 thereof being formed to have the desired taper along a corresponding surface thereof and at the necessary positions therealong, which may include the stem 52 being shaped to include the structure of any of the disclosed engagement elements 80, 180, 280 in a monolithic or integral fashion, although this configuration does not allow for ease or replacement or repair to the ram tool 50 in comparison to the use of removable and replaceable components as described herein. Although the manufacturing assembly 101 is shown and described as including use of both the funnel tool 20 and the ram tool 50 for interacting beneficially with one another in properly locating and orienting all relevant components and features, it should be apparent that certain advantages are present in utilizing only select features of the funnel tool 20 and the ram tool 50, depending on the circumstances. That is, embodiments of the present invention may include the use of only certain features described herein while still appreciating benefits over existing systems and methods.

The funnel tool 20 may, for example, be utilized in conjunction with a ram tool having a planar engagement surface 9 (and hence devoid of engagement elements) as shown and described with respect to the ram tool 8 while still including the keyway 60 as shown and described with respect to the ram tool 50. Such a combination does not ensure that the snap ring 13 is expanded radially outwardly upon reaching a corresponding retention groove 17a, 17b, but does ensure that each installation of one of the snap rings 13 includes the same configuration of the installed snap ring 13 relative to the remainder of the corresponding multi-axial/universal joint as well as relative to the manufacturing assembly employing such a modified ram tool, which provides the benefits described above in inspecting, correcting, servicing, or repairing such features.

The ram tool 50 may also be utilized in the absence of the keyway 60 while maintaining use of the engagement elements 80 in the manner described herein, wherein such a ram tool 50 may be utilized in conjunction with the funnel tool 5 devoid of the key 30. Such a combination may require locating means for properly orienting the snap ring 13 within the funnel tool 5 for desired interaction with the engagement elements 80 upon entry into a yoke bore 16a, 16b, but the ram tool 50 would still appreciate the same benefits in performing the radial outward expansion of the snap ring 13 when so properly aligned.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A manufacturing assembly for installation of a snap ring into a bore extending through a structure, the snap ring including an original configuration and a constricted configuration from which the snap ring attempts to resiliently expand back towards the original configuration, the manufacturing assembly comprising:
    a ram tool configured to axially force the snap ring through the bore towards a retention groove formed therealong with the snap ring in the constricted configuration, an axially distal end of the ram tool facing towards the snap ring including one or more engagement elements, each of the engagement elements having a tapered engagement surface configured to apply a radially outwardly extending force to the snap ring during passage thereof through the bore to urge the snap ring to expand from the constricted configuration back towards the original configuration upon the snap ring reaching the retention groove, wherein each of the engagement elements is removably coupled to a stem of the ram tool at the axially distal end thereof, wherein a retention element coupled to the stem at the axially distal end of the ram tool constrains axial and radial movement of each of the engagement elements relative to the stem.

2. The manufacturing assembly of claim 1, wherein the engagement surface of each of the engagement elements is a convex arcuate surface facing outwardly in the axial direction of movement of the ram tool when forcing the snap ring through the bore.

3. The manufacturing assembly of claim 2, wherein the engagement surface of each of the engagement elements includes a spherical shape.

4. The manufacturing assembly of claim 1, wherein each of the engagement elements is partially received within a corresponding socket recessed into the stem at the axially distal end of the ram tool.

5. The manufacturing assembly of claim 4, wherein an exposed portion of each of the engagement elements protrudes axially outside of the corresponding socket, and wherein the engagement surface of each of the engagement elements is formed along the exposed portion thereof.

6. The manufacturing assembly of claim 5, wherein the exposed portion of each of the engagement elements includes a shape of half a sphere or less than half a sphere.

7. The manufacturing assembly of claim 5, wherein each of the engagement elements is repositionable within the corresponding socket to result in a different portion of the engagement element forming the exposed portion thereof.

8. The manufacturing assembly of claim 1, wherein the ram tool includes a plurality of the engagement elements disposed in an annularly extending array.

9. The manufacturing assembly of claim 8, wherein the snap ring includes an annularly extending segment, a first end segment bent inwardly at a first end of the annularly extending segment, and a second end segment bent inwardly at a second end of the annularly extending segment, and wherein the annularly extending array of the engagement elements is configured to engage the annularly extending segment of the snap ring while the first end segment and the second end segment of the snap ring are configured to extend through a gap present along the annularly extending array of the engagement elements.

10. The manufacturing assembly of claim 9, further comprising a funnel tool having an inner surface defining a passageway leading into the bore of the structure, the inner surface of the funnel tool configured to constrict the snap ring from the original configuration to the constricted configuration during passage of the snap ring through the passageway, the funnel tool including an alignment key extending radially inwardly from the inner surface of the funnel tool, wherein the ram tool includes a keyway formed therein that is configured to receive the alignment key of the funnel tool therein during passage of the ram tool through the passageway of the funnel tool, and wherein the snap ring is configured to be received within the passageway of the funnel tool with the alignment key extending radially inwardly into an opening present between the first end segment and the second end segment of the snap ring.

11. The manufacturing assembly of claim 1, wherein the structure is a yoke of a multi-axial joint and the snap ring engages a bearing cup assembly disposed within the bore that is associated with rotatably supporting a cross member of the multi-axial joint.

12. A manufacturing assembly for installation of a snap ring into a bore extending through a structure, the manufacturing assembly comprising:
    a funnel tool having an inner surface defining a passageway leading into the bore of the structure and an alignment key disposed within the passageway and extending in an axial direction thereof, the inner surface of the funnel tool configured to constrict the snap ring from an original configuration to a constricted configuration during passage of the snap ring through the passageway, the constricted configuration of the snap ring allowing passage of the snap ring through the bore while the snap ring attempts to resiliently expand back to the original configuration; and
    a ram tool configured to axially force the snap ring through the passageway of the funnel tool and the bore of the structure until the snap ring resiliently expands back towards the original configuration within a retention groove formed along the bore, the ram tool including a keyway formed therein that is configured to receive the alignment key of the funnel tool during movement of the ram tool through the passageway of the funnel tool.

13. The manufacturing assembly of claim 12, wherein one or both of the keyway and the alignment key includes a tapered surface where the alignment key is initially received into the keyway during movement of the ram tool through the passageway.

14. The manufacturing assembly of claim 12, wherein the snap ring includes an annularly extending segment, a first end segment bent inwardly at a first end of the annularly extending segment, and a second end segment bent inwardly at a second end of the annularly extending segment, and wherein the snap ring is configured to be received within the passageway of the funnel tool with the alignment key extending radially inwardly into an opening present between the first end segment and the second end segment of the snap ring.

15. The manufacturing assembly of claim 12, wherein the structure is a yoke of a multi-axial joint and the snap ring engages a bearing cup assembly disposed within the bore that is associated with rotatably supporting a cross member of the multi-axial joint.

16. A method of installing a snap ring into a bore of a structure comprising the steps of:

constricting a snap ring from an original configuration to a constricted configuration from which the snap ring attempts to resiliently expand back towards the original configuration;

applying a force to the snap ring when the snap ring is in the constricted configuration and disposed within the bore, the force applied by an engagement surface of a ram tool, the force including an axial component and a radial component, the axial component directed in the axial direction of the bore to cause the snap ring to move through the bore towards a retention groove formed therealong and the radial component directed in a radially outward direction of the bore to urge the snap ring to expand back towards the original configuration upon reaching an axial position of the retention groove, wherein the step of constricting the snap ring from the original configuration to the constricted configuration includes the ram tool pushing the snap ring through an inwardly tapered portion of a passageway formed through a funnel tool and leading into the bore of the structure, wherein the funnel tool includes an alignment key configured to be received within a keyway formed in the ram tool as the ram tool moves through the passageway of the funnel tool;

disposing the snap ring in the tapered portion of the passageway with the snap ring located relative to the alignment key; and disposing the funnel tool to axially align the alignment key thereof with the keyway of the ram tool.

\* \* \* \* \*